(12) United States Patent
Wakana

(10) Patent No.: US 10,925,143 B2
(45) Date of Patent: *Feb. 16, 2021

(54) LASER APPARATUS AND EUV LIGHT GENERATING SYSTEM

(71) Applicant: Gigaphoton Inc., Tochigi (JP)

(72) Inventor: Katsuhiko Wakana, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/674,793

(22) Filed: Nov. 5, 2019

(65) Prior Publication Data

US 2020/0077500 A1  Mar. 5, 2020

Related U.S. Application Data

(63) Continuation of application No. PCT/JP2017/020768, filed on Jun. 5, 2017.

(51) Int. Cl.
*H05G 2/00* (2006.01)
*G02B 26/08* (2006.01)

(52) U.S. Cl.
CPC ......... *H05G 2/008* (2013.01); *G02B 26/0816* (2013.01)

(58) Field of Classification Search
CPC .................. H05G 2/008; G02B 26/0816
USPC ................. 250/493.1, 494.1, 504 R
See application file for complete search history.

(56) References Cited

U.S. PATENT DOCUMENTS

| 2010/0078577 A1 | 4/2010 | Moriya et al. |
| 2010/0097602 A1 | 4/2010 | LaFortune et al. |
| 2013/0208742 A1 | 8/2013 | Mizoguchi et al. |
| 2019/0313519 A1* | 10/2019 | Yabu .............. G02B 26/105 |

FOREIGN PATENT DOCUMENTS

| JP | 2009-109823 A | 5/2009 |
| JP | 2010-186735 A | 8/2010 |
| JP | 2012-175006 A | 9/2012 |

OTHER PUBLICATIONS

International Search Report issued in PCT/JP2017/020768; dated Aug. 29, 2017.
International Preliminary Report on Patentability and Written Opinion issued in PCT/JP2017/020768; dated Dec. 10, 2019.

* cited by examiner

*Primary Examiner* — Nicole M Ippolito
(74) *Attorney, Agent, or Firm* — Studebaker & Brackett PC

(57) ABSTRACT

A laser apparatus includes an optical element disposed on a laser beam axis, an actuator configured to displace the optical element to displace the laser beam axis, a driving amount monitor configured to monitor a driving amount of the actuator, an optical axis monitor disposed along the laser beam axis and configured to monitor the laser beam axis, and a control unit configured to control the actuator based on a monitoring result of the optical axis monitor and determine abnormality of the optical element based on a monitoring result of the driving amount monitor.

9 Claims, 18 Drawing Sheets

LASER APPARATUS AND EUV LIGHT GENERATING SYSTEM

CROSS-REFERENCE TO RELATED APPLICATIONS

The present application is a continuation application of International Application No. PCT/JP2017/020768 filed on Jun. 5, 2017. The content of the application is incorporated herein by reference in its entirety.

BACKGROUND

1. Technical Field

The present disclosure relates to a laser apparatus and an EUV light generating system.

2. Related Art

In recent years, along with microfabrication in the semiconductor manufacturing process, fine transfer patterns in photolithography of the semiconductor manufacturing process have been developed rapidly. In the next generation, microfabrication of 20 nm or smaller will be required. Accordingly, it is expected to develop an exposure apparatus in which a device for generating extreme ultraviolet (EUV) light having a wavelength of about 13 nm and a reflection reduction projection optical system are combined.

As EUV light generating apparatuses, three types of apparatuses are proposed, namely, a laser produced plasma (LPP) type apparatus that uses plasma generated when a target substance is irradiated with a laser beam, a discharge produced plasma (DPP) type apparatus that uses plasma generated by discharging, and a synchrotron radiation (SR) type apparatus that uses orbital radiation light.

LIST OF DOCUMENTS

Patent Documents

Patent Document 1: Japanese Unexamined Patent Application Publication No. 2009-109823

SUMMARY

A laser apparatus according to one aspect of the present disclosure may include an optical element, an actuator, a driving amount monitor, an optical axis monitor, and a control unit. The optical element may be disposed on a laser beam axis. The actuator may be configured to displace the optical element to displace the laser beam axis. The driving amount monitor may be configured to monitor a driving amount of the actuator. The optical axis monitor may be disposed along the laser beam axis and may be configured to monitor the laser beam axis. The control unit may be configured to control the actuator based on a monitoring result of the optical axis monitor, and determine abnormality of the optical element based on a monitoring result of the driving amount monitor.

An EUV light generating system according to one aspect of the present disclosure may include an EUV chamber in which EUV light is generated; and a laser apparatus. The laser apparatus may be configured to emit laser beam to be guided to the EUV chamber. The laser apparatus may include an optical element, an actuator, a driving amount monitor, an optical axis monitor, and a control unit. The optical element may be disposed on a laser beam axis. The actuator may be configured to displace the optical element to displace the laser beam axis. The driving amount monitor may be configured to monitor a driving amount of the actuator. The optical axis monitor may be disposed along the laser beam axis and may be configured to monitor the laser beam axis. The control unit may be configured to control the actuator based on a monitoring result of the optical axis monitor, and determine abnormality of the optical element based on a monitoring result of the driving amount monitor.

BRIEF DESCRIPTION OF THE DRAWINGS

Some embodiments of the present disclosure will be described below as just examples with reference to the accompanying drawings.

DESCRIPTION OF EMBODIMENTS

<Contents>
<1. Overall description of EUV light generating apparatus> (FIG. 1)
1.1 Configuration
1.2 Operation
<2. Comparative example> (Laser apparatus having function of optical axis control, and EUV light generating system) (FIGS. 2 to 9)
2.1 Configuration
2.2 Operation
2.3 Problem
<3. First Embodiment> (Laser apparatus having function of determining abnormality of optical element based on driving amount of actuator) (FIGS. 11 to 20)
3.1 Configuration
3.2 Operation
3.3 Effect
<4. Second Embodiment> (Laser apparatus having function of determining abnormality of optical element based on driving amount of actuator and monitoring result of optical axis monitor) (FIGS. 21, 22)
4.1 Configuration and Operation
4.2 Effect
<5. Others>

Hereinafter, embodiments of the present disclosure will be described in detail with reference to the drawings.

The embodiments described below illustrate some examples of the present disclosure, and do not limit the contents of the present disclosure. All of the configurations and the operations described in the embodiments are not always indispensable as configurations and operations of the present disclosure.

It should be noted that the same constituent elements are denoted by the same reference signs, and overlapping description is omitted.

1. Overall Description of EUV Light Generating Apparatus

[1.1 Configuration]

Figure 1:
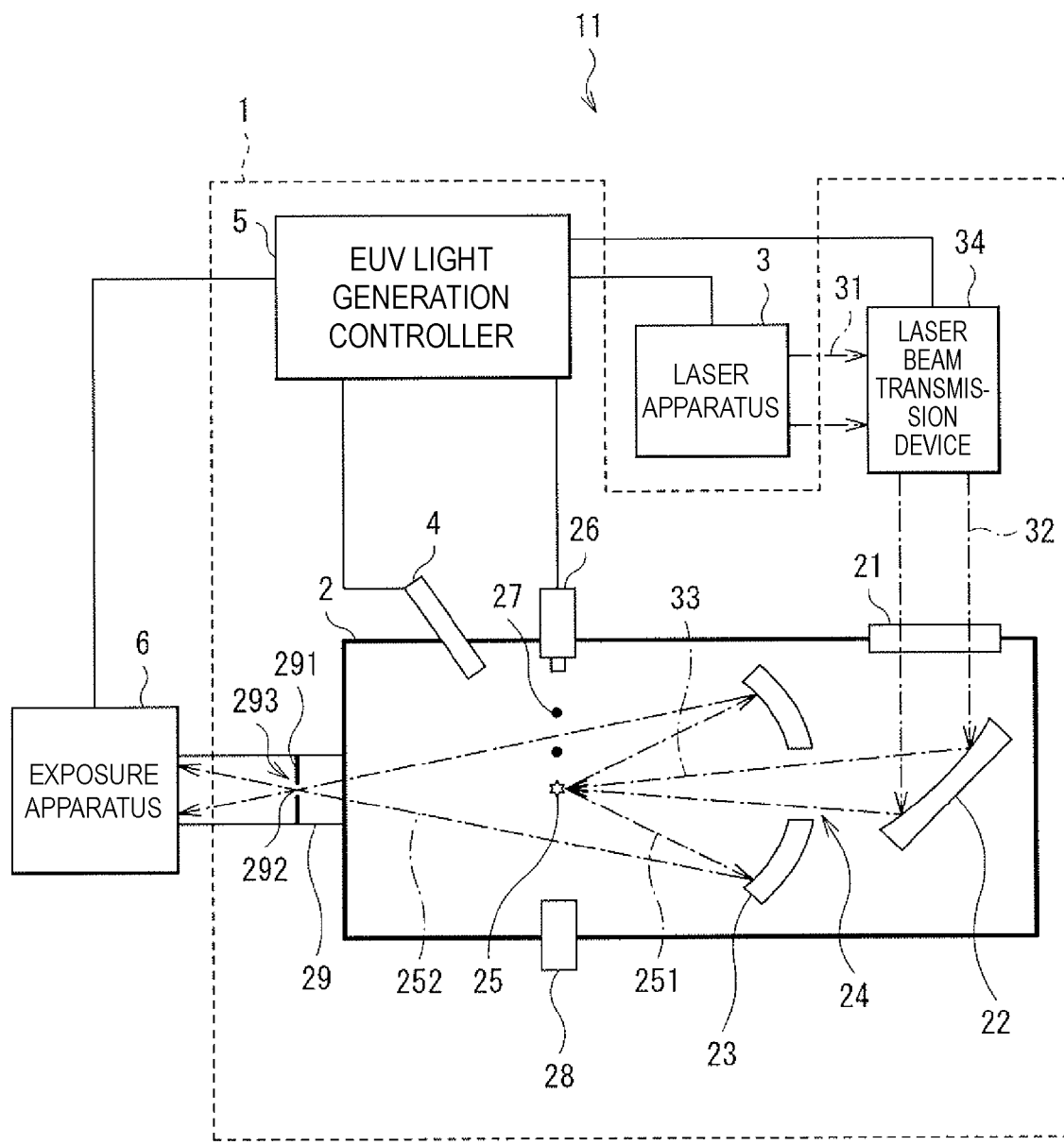
FIG. 1 schematically illustrates an exemplary configuration of an exemplary LPP type EUV light generating system.

FIG. 1 schematically illustrates a configuration of an exemplary LPP type EUV light generating system. An EUV light generating apparatus 1 may be used together with at least one laser apparatus 3. In the present application, a system including the EUV light generating apparatus 1 and the laser apparatus 3 is referred to as an EUV light generating system 11. As illustrated in FIG. 1 and described below in detail, the EUV light generating apparatus 1 includes a chamber 2 and a target supply unit 26. The chamber 2 is a sealable container. The target supply unit 26 is configured to supply a target substance to the inside of the chamber 2, and is mounted so as to penetrate a wall of the chamber 2, for example. The material of the target substance may include, but not limited to, tin, terbium, gadolinium, lithium, xenon, or a combination of any two or more of them.

A wall of the chamber 2 has at least one through-hole. The through-hole is closed with a window 21 that transmits a pulse laser beam 32 emitted from the laser apparatus 3. In the chamber 2, an EUV light condenser mirror 23 having a spheroidal reflective surface is disposed. The EUV light condenser mirror 23 has first and second focal points. On the surface of the EUV light condenser mirror 23, a multilayer reflective film in which molybdenum and silicon are alternately layered is formed, for example. The EUV light condenser mirror 23 may be disposed such that the first focal point thereof is positioned in a plasma generating region 25 and the second focal point thereof is positioned at an intermediate focal point (IF) 292, for example. A center portion of the EUV light condenser mirror 23 has a through-hole 24 through which a pulse laser beam 33 passes.

The EUV light generating apparatus 1 includes an EUV light generation controller 5, a target sensor 4, and the like. The target sensor 4 is configured to detect any of, or a plurality of, presence, trajectory, position, and velocity of the target 27. The target sensor 4 may have an imaging function.

The EUV light generating apparatus 1 also includes a connecting section 29 that allows the inside of the chamber 2 and the inside of the exposure apparatus 6 to communicate with each other. The inside of the connecting section 29 is provided with a wall 291 having an aperture 293. The wall 291 may be disposed such that the aperture 293 is positioned at the second focal point of the EUV light condenser mirror 23.

The EUV light generating apparatus 1 also includes a laser beam transmission device 34, a laser beam condenser mirror 22, a target collecting unit 28 for collecting the target 27, and the like. The laser beam transmission device 34 includes an optical element for defining a transmission state of a laser beam, and an actuator for regulating the position, posture, and the like of the optical element.

[1.2 Operation]

Operation of an exemplary LPP type EUV light generating system will be described with reference to FIG. 1. The pulse laser beam 31, emitted from the laser apparatus 3, passes through the window 21 as a pulse laser beam 32 via the laser beam transmission device 34, and enters the chamber 2. The pulse laser beam 32 travels inside the chamber 2 along at least one laser beam path, is reflected by the laser beam condenser mirror 22, and is emitted to at least one target 27 as a pulse laser beam 33.

The target supply unit 26 is configured to output a target 27, made of a target substance, toward a plasma generating region 25 in the chamber 2. The target 27 is irradiated with at least one pulse included in the pulse laser beam 33. The target 27 irradiated with the pulse laser beam is made into plasma, and radiation light 251 is radiated from the plasma. EUV light 252 included in the radiation light 251 is selectively reflected by the EUV light condenser mirror 23. The EUV light 252 reflected by the EUV light condenser mirror 23 is condensed at the intermediate focal point 292, and is emitted to the exposure apparatus 6. It should be noted that one target 27 may be irradiated with a plurality of pulses included in the pulse laser beam 33.

The EUV light generation controller 5 is configured to supervise control of the entire EUV light generating system 11. The EUV light generation controller 5 is configured to process a detection result of the target sensor 4. The EUV light generation controller 5 may be configured to control, for example, the output timing of the target 27, the output direction of the target 27, and the like based on a detection result of the target sensor 4. The EUV light generation controller 5 may also be configured to control the oscillation timing of the laser apparatus 3, the traveling direction of the pulse laser beam 32, the condensing position of the pulse laser beam 33, and the like, for example. The aforementioned various types of control are mere examples. Other types of control may be added as required.

<2. Comparative Example> (Laser Apparatus Having Function of Optical Axis Control, and EUV Light Generating System)

[2.1 Configuration]

Figure 2:
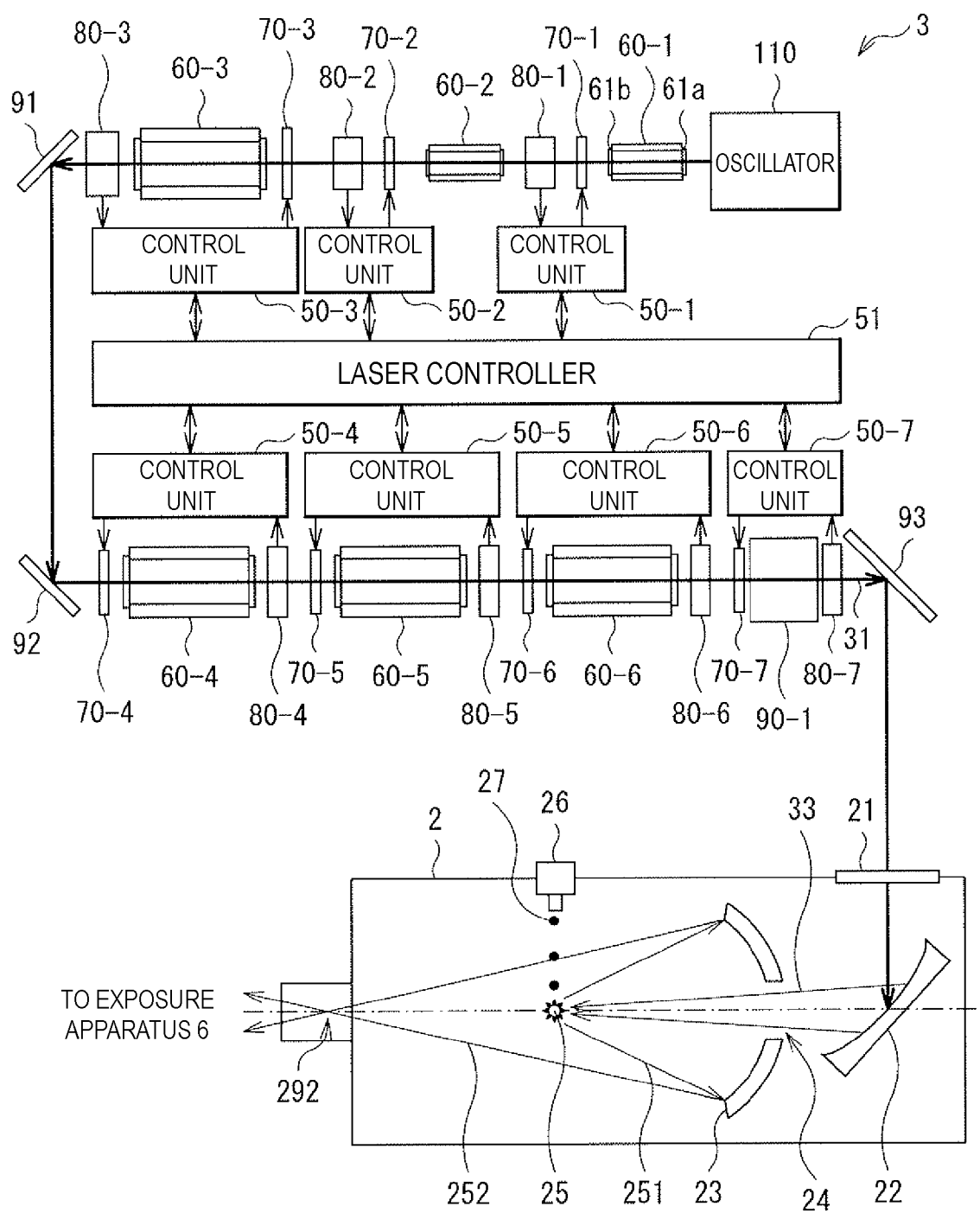
FIG. 2 schematically illustrates an exemplary configuration of a laser apparatus and an EUV light generating system according to a comparative example.

FIG. 2 schematically illustrates an exemplary configuration of a laser apparatus and an EUV light generating system according to a comparative example.

The basic configurations of a laser apparatus and an EUV light generating system according to the comparative example are almost similar to those of the laser apparatus 3 and the EUV light generating system 11 illustrated in FIG. 1. Therefore, parts almost similar to the components of the laser apparatus 3 and the EUV light generating system 11 illustrated in FIG. 1 are denoted by the same reference signs and the description thereof is omitted as appropriate.

The EUV light generating system according to the comparative example may include at least the chamber 2 as an EUV chamber for generating EUV light and the laser apparatus 3 that emits pulse laser beam 31 to be guided to the chamber 2.

The laser apparatus 3 according to the comparative example may include a plurality of control units 50-1 to 50-7, a laser controller 51, and an oscillator 110.

The laser apparatus 3 may also include a plurality of amplifiers 60-1 to 60-6, a plurality of actuator units 70-1 to 70-7, a plurality of monitor units 80-1 to 80-7, an optical module 90-1, and high-reflective mirrors 91, 92, and 93, on the laser beam axis of the pulse laser beam 31 emitted from the oscillator 110.

The oscillator 110 may be a master oscillator that outputs the pulse laser beam 31.

The laser apparatus 3 emits the pulse laser beam 31 from the oscillator 110 toward the chamber 2 as an EUV chamber, via the amplifiers 60-1 to 60-6, the optical module 90-1, and the like. Here, in the laser apparatus 3, a side close to the oscillator 110 along the optical path of the pulse laser beam 31 is referred to as an upstream side, and a side close to the chamber 2 is referred to as a downstream side. The pulse laser beam 31 travels from the upstream side toward the downstream side.

Each of the amplifiers 60-1 to 60-6 may include a laser chamber that amplifies the pulse laser beam 31, an entrance window 61a that the pulse laser beam 31 enters, and an emission window 61b from which the pulse laser beam 31 is emitted. The laser chamber may include an internal electrode for discharging.

Among the amplifiers 60-1 to 60-6, the amplifiers 60-1 and 60-2 may be oscillator amplifiers. The amplifier 60-3 may be a preamplifier. The amplifiers 60-4 to 60-6 may be main amplifiers.

The actuator unit 70-1 and the monitor unit 80-1 may be disposed on the laser emission side of the amplifier 60-1. The actuator unit 70-2 and the monitor unit 80-2 may be disposed on the laser emission side of the amplifier 60-2.

The actuator unit 70-3 may be disposed on the laser entrance side of the amplifier 60-3, and the monitor unit 80-3 may be disposed on the laser emission side of the amplifier 60-3. The actuator unit 70-4 may be disposed on the laser entrance side of the amplifier 60-4, and the monitor unit 80-4 may be disposed on the laser emission side of the amplifier 60-4. The actuator unit 70-5 may be disposed on the laser entrance side of the amplifier 60-5, and the monitor unit 80-5 may be disposed on the laser emission side of the amplifier 60-5. The actuator unit 70-6 may be disposed on the laser entrance side of the amplifier 60-6, and the monitor unit 80-6 may be disposed on the laser emission side of the amplifier 60-6.

The actuator unit 70-7 may be disposed on the laser entrance side of the optical module 90-1, and the monitor unit 80-7 may be disposed on the laser emission side of the optical module 90-1.

The high-reflective mirrors 91 and 92 may be provided on the optical path between the monitor unit 80-3 and the actuator unit 70-4. The high-reflective mirror 93 may be disposed such that the pulse laser beam 31 having emitted from the monitor unit 80-7 is emitted toward the chamber 2 as an EUV chamber.

Figure 3:
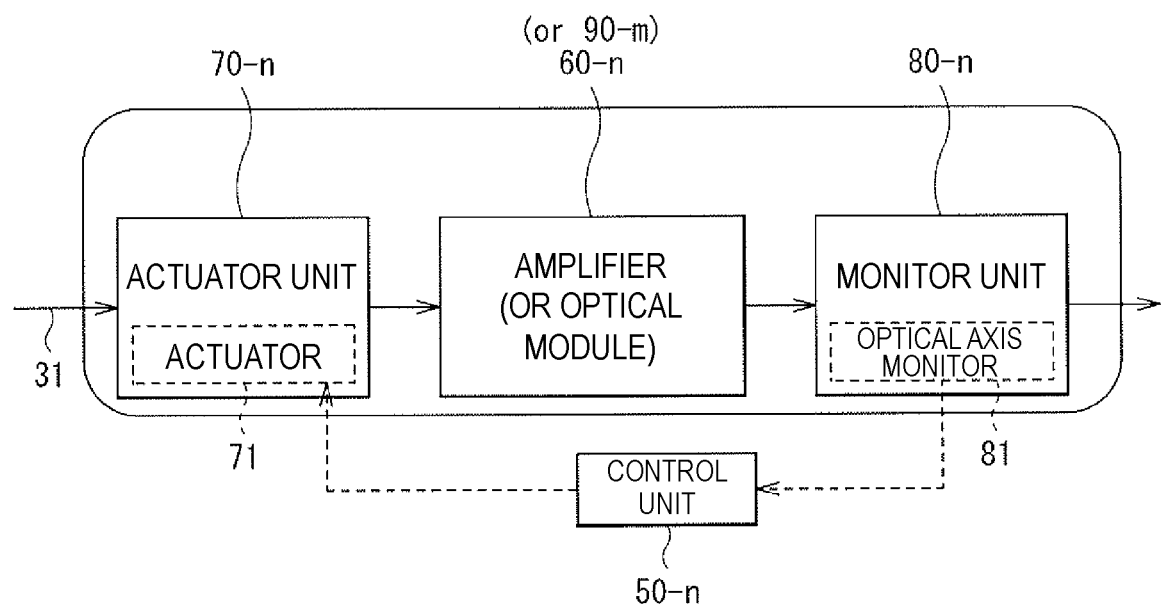
FIG. 3 schematically illustrates a first exemplary configuration of one optical unit in the laser apparatus according to the comparative example.
Figure 4:
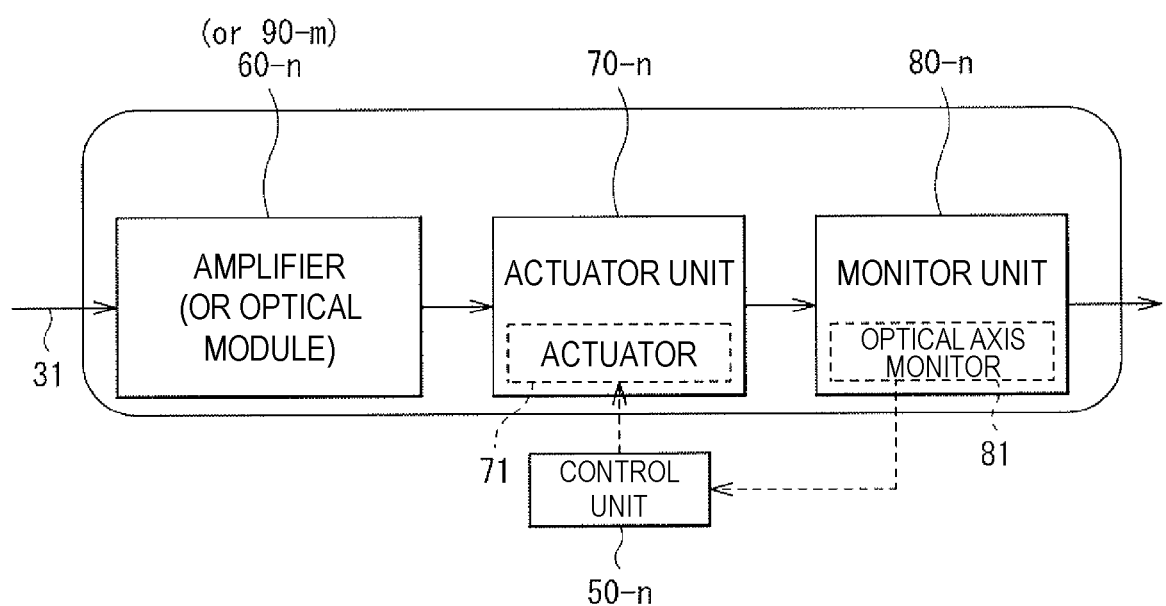
FIG. 4 schematically illustrates a second exemplary configuration of one optical unit in the laser apparatus according to the comparative example.
Figure 7:
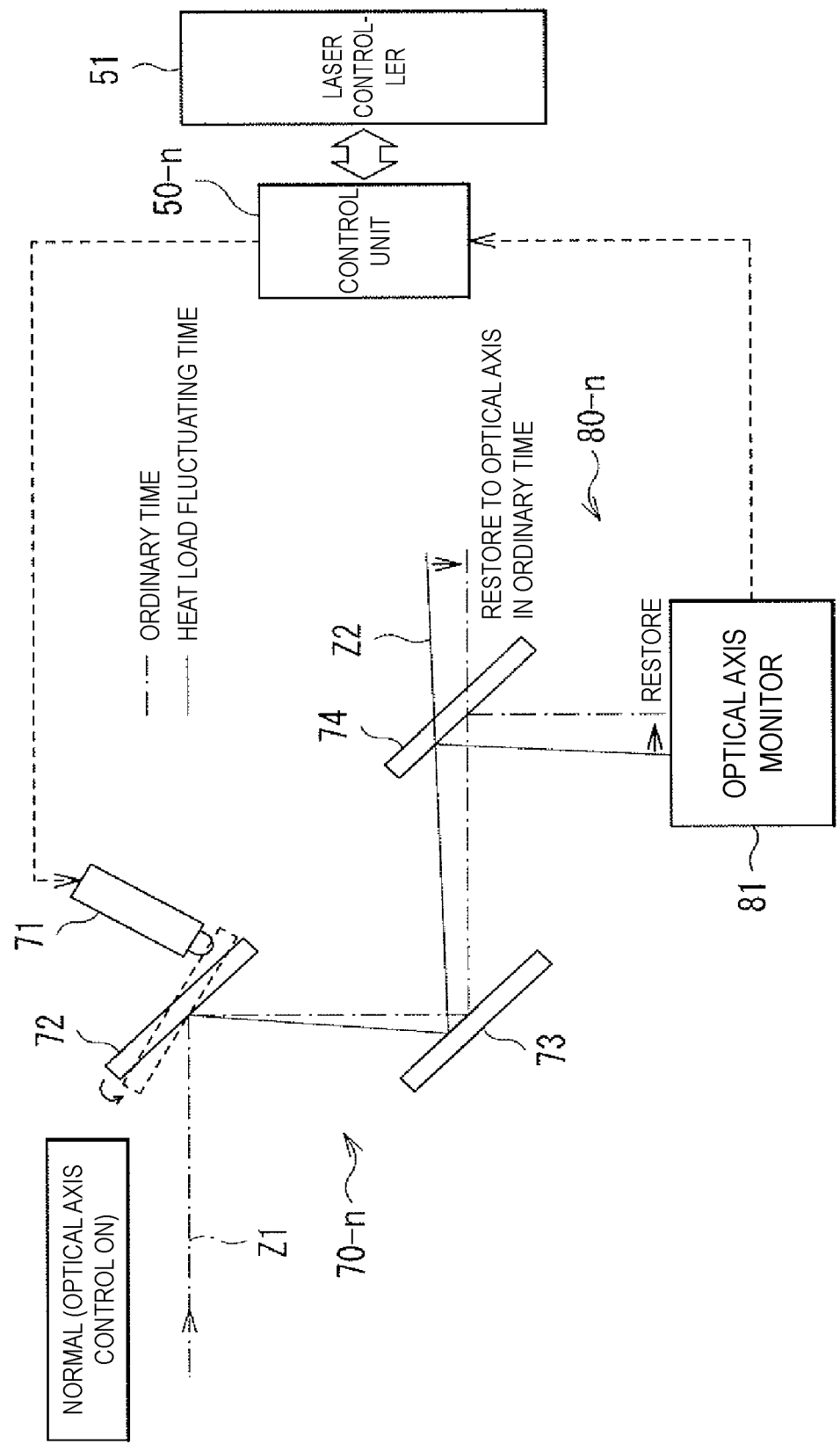
FIG. 7 schematically illustrates exemplary states of a laser beam axis in an ordinary time and in a heat load fluctuating time when optical axis control by an actuator is on, in the laser apparatus according to the comparative example.

Each of the actuator units 70-1 to 70-7 may include at least one optical element disposed on the laser beam axis. At least one optical element may include an optical element for position control and an optical element for pointing control. Each of the actuator units 70-1 to 70-7 may also include an actuator 71 that displaces the laser beam axis by displacing at least one optical element as illustrated in FIGS. 3, 4, 7, and elsewhere described below. The actuator 71 may include an actuator for position control provided for an optical element for position control, and an actuator for pointing control provided for an optical element for pointing control.

Each of the monitor units 80-1 to 80-7 may include an optical axis monitor 81 that is disposed along a laser beam axis and monitors the laser beam axis, as illustrated in FIGS. 3, 4, 7, and elsewhere described below. The optical axis monitor 81 may monitor the beam position and the beam pointing of the pulse laser beam 31.

The control unit 50-1 is connected with the actuator 71 of the actuator unit 70-1 and the optical axis monitor 81 of the monitor unit 80-1. The control unit 50-2 is connected with the actuator 71 of the actuator unit 70-2 and the optical axis monitor 81 of the monitor unit 80-2. The control unit 50-3 is connected with the actuator 71 of the actuator unit 70-3 and the optical axis monitor 81 of the monitor unit 80-3. The control unit 50-4 is connected with the actuator 71 of the actuator unit 70-4 and the optical axis monitor 81 of the monitor unit 80-4. The control unit 50-5 is connected with the actuator 71 of the actuator unit 70-5 and the optical axis monitor 81 of the monitor unit 80-5. The control unit 50-6 is connected with the actuator 71 of the actuator unit 70-6 and the optical axis monitor 81 of the monitor unit 80-6. The control unit 50-7 is connected with the actuator 71 of the actuator unit 70-7 and the optical axis monitor 81 of the monitor unit 80-7.

Each of the control units 50-1 to 50-7 is connected with the laser controller 51. Each of the control units 50-1 to 50-7 may be a local control unit. The laser controller 51 may be provided to each local control unit and may be a supervisory control unit that controls each local control unit in a supervisory manner.

The laser controller 51 may be connected with the EUV light generation controller 5 of FIG. 1.

Note that the respective control units, amplifiers, actuator units, monitor units, optical modules, and high-reflective mirrors described above may be provided in a larger or smaller number than the number described above.

Here, arbitrary $n^{th}$ components of the respective control units, amplifiers, actuator units, monitor units, and optical modules may constitute one optical unit, as illustrated in FIGS. 3 and 4.

FIG. 3 schematically illustrates a first exemplary configuration of one optical unit in the laser apparatus 3 according to the comparative example. FIG. 4 schematically illustrates a second exemplary configuration of one optical unit in the laser apparatus 3 according to the comparative example.

Here, among the amplifiers 60-1 to 60-6 in FIG. 2, an arbitrary $n^{th}$ amplifier is denoted by a reference sign 60-$n$. Among the actuator units 70-1 to 70-7, an arbitrary $n^{th}$ actuator unit is denoted by a reference sign 70-$n$. Among the monitor units 80-1 to 80-7, an arbitrary $n^{th}$ monitor unit is denoted by a reference sign 80-$n$. Among the control units 50-1 to 50-7, an arbitrary $n^{th}$ control unit is denoted by a reference sign 50-$n$. Further, the optical module 90-1 is described as an arbitrary $m^{th}$ optical module 90-$m$. FIGS. 3 and 4 illustrate an exemplary configuration of an arbitrary $n^{th}$ optical unit.

As illustrated in FIG. 3, one optical unit may be configured of the actuator unit 70-$n$, the amplifier 60-$n$ or the optical module 90-$m$, and the monitor unit 80-$n$ that are sequentially disposed from the upstream side toward the downstream side along the optical axis of the pulse laser beam 31.

Further, as illustrated in FIG. 4, one optical unit may be configured of the amplifier 60-$n$ or the optical module 90-$m$, the actuator unit 70-$n$, and the monitor unit 80-$n$ that are sequentially disposed from the upstream side toward the downstream side along the optical axis of the pulse laser beam 31.

The control unit 50-$n$ may be provided to the $n^{th}$ optical unit, and perform optical axis control in the $n^{th}$ optical unit. The control unit 50-$n$ may perform optical axis control in the $n^{th}$ optical unit by controlling driving of the actuator 71 of the actuator unit 70-$n$, based on the monitoring result of the optical axis monitor 81 of the monitor unit 80-$n$. Thereby, the control unit 50-$n$ may perform feedback control such that the beam position and the beam pointing of the laser beam axis in the $n^{th}$ optical unit become a desired state.

Figure 5:
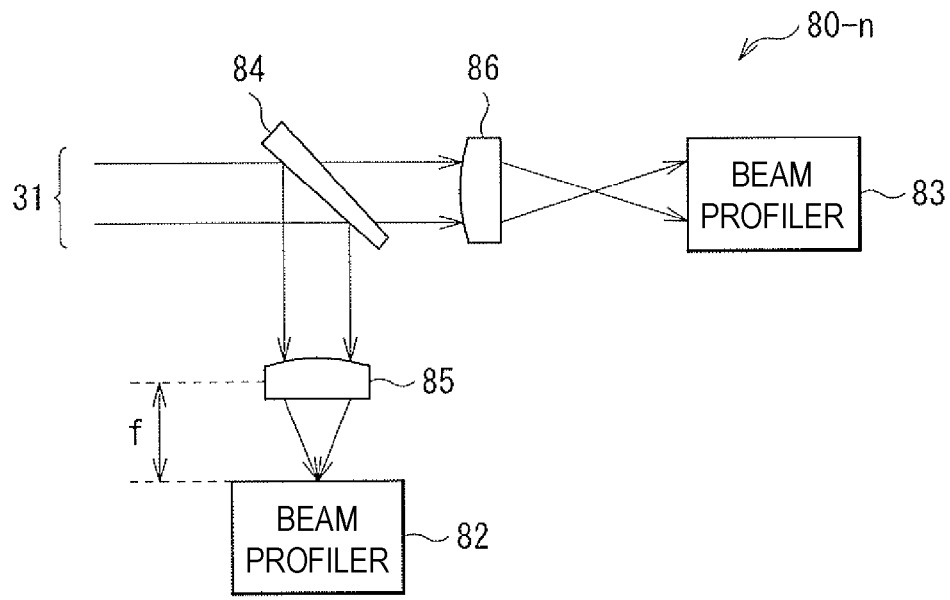
FIG. 5 schematically illustrates an exemplary configuration of a monitor unit in the laser apparatus according to the comparative example.

FIG. 5 schematically illustrates an exemplary configuration of the monitor unit 80-$n$.

The monitor unit 80-$n$ may include a beam profiler 82, a beam profiler 83, a beam splitter 84 with a wedge, a lens 85, and a lens 86. These components may be disposed along the laser beam axis of the pulse laser beam 31. These components may be disposed along the laser beam axis of the pulse laser beam 31 split by the beam splitter 74, illustrated in FIG. 6 and elsewhere, disposed on the optical path of the pulse laser beam 31, as described below.

At least the beam profiler 82 and the beam profiler 83 may constitute the optical axis monitor 81 of the monitor unit 80-$n$.

The lens 86 and the beam profiler 83 may be disposed on the optical path of the pulse laser beam 31 having passed through the beam splitter 84 with a wedge. The lens 86 and the beam profiler 83 may be components for measuring the beam position. The beam profiler 83 may be able to calculate the beam position from the position of the center of gravity of the beam profile on the laser beam cross-section of the pulse laser beam 31.

The lens 85 and the beam profiler 82 may be disposed on the optical path of the pulse laser beam 31 reflected at the beam splitter 84 with a wedge. The lens 85 and the beam profiler 82 may be components for measuring beam pointing. The beam profiler 82 is disposed at the focal point position of the lens 85. The beam profiler 82 may be able to calculate the beam pointing from the position of the center of gravity of the cross-section intensity profile of the laser beam of the pulse laser beam 31 and the focal length f of the lens 85.

[2.2 Operation]

Figure 6:
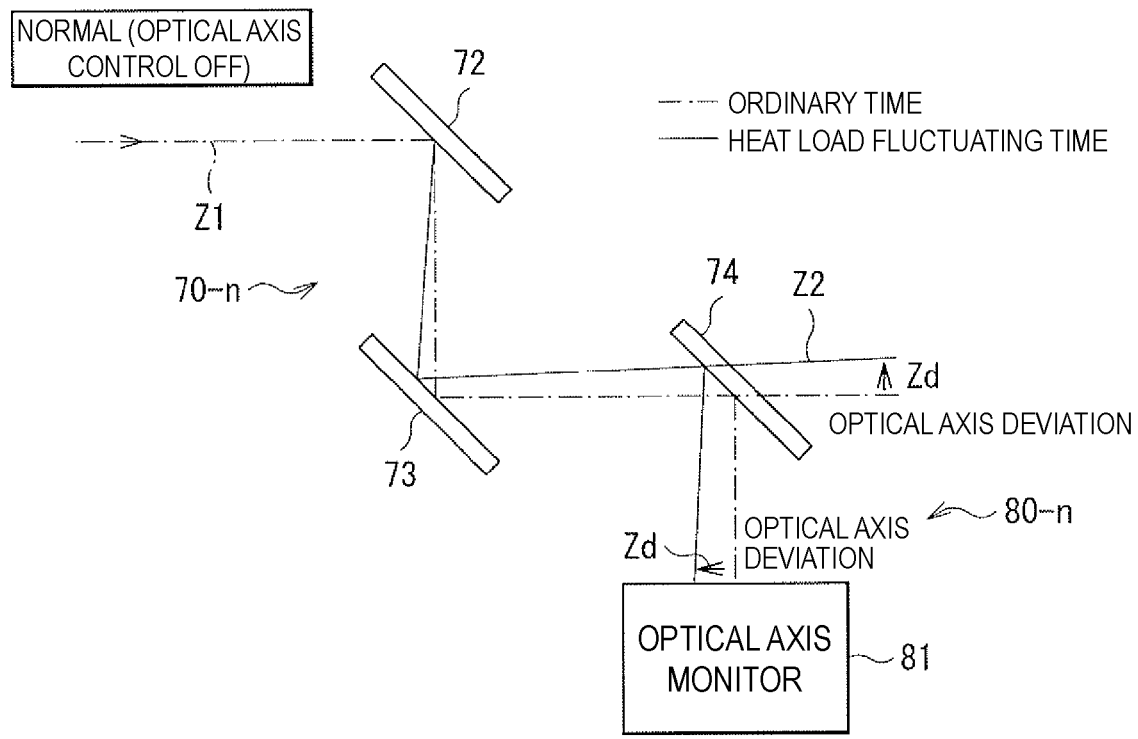
FIG. 6 schematically illustrates exemplary states of a laser beam axis in an ordinary time and in a heat load fluctuating time when optical axis control by an actuator is off, in the laser apparatus according to the comparative example.

FIG. 6 schematically illustrates exemplary states of a laser beam axis in an ordinary time and in a heat load fluctuating time when the optical axis control by the actuator 71 is off, in the laser apparatus 3 according to the comparative example.

The actuator unit 70-$n$ may include a reflective mirror 72 and a reflective mirror 73 as optical elements. The monitor unit 80-$n$ may include a beam splitter 74 provided on the optical path of the pulse laser beam 31 reflected by the reflective mirror 72 and the reflective mirror 73. The beam splitter 74 may reflect part of the beam of the pulse laser beam 31 reflected by the reflective mirror 72 and the reflective mirror 73, toward the optical axis monitor 81.

FIG. 6 illustrates a laser beam axis Z1 in the ordinary time and a laser beam axis Z2 in a heat load fluctuating time when it fluctuates because a heat load is generated in an optical element or the like. Due to the heat load, optical axis deviation of an optical axis deviation amount Zd is caused with respect to the laser beam axis Z1 in the ordinary time.

FIG. 7 schematically illustrates exemplary states of a laser beam axis in the ordinary time and in a heat load fluctuating time when the optical axis control by the actuator 71 is on, in the laser apparatus 3 according to the comparative example.

As illustrated in FIG. 7, the actuator 71 may be provided to the reflective mirror 72 to perform optical axis control. Alternatively, the actuator 71 may be provided to the reflective mirror 73 to perform optical axis control. In that case, it is also possible to use different optical elements for position control and for pointing control, and to control the beam position and the beam pointing of the laser beam axis separately. For example, the reflective mirror 72 on the relatively upstream side may be used as an optical element for position control, and the actuator 71 provided to the reflective mirror 72 may be used for position control. Further, the reflective mirror 73 on the relatively downstream side may be used as an optical element for pointing control, and the actuator 71 provided to the reflective mirror 73 may be used for pointing control.

The control unit 50-$n$ may control driving of the actuator 71 so that the laser beam axis is restored to the laser beam axis Z1 in the ordinary time, based on the optical axis deviation amount Zd of the laser beam axis Z2 in the heat load fluctuating time measured by the optical axis monitor 81.

Figure 8:
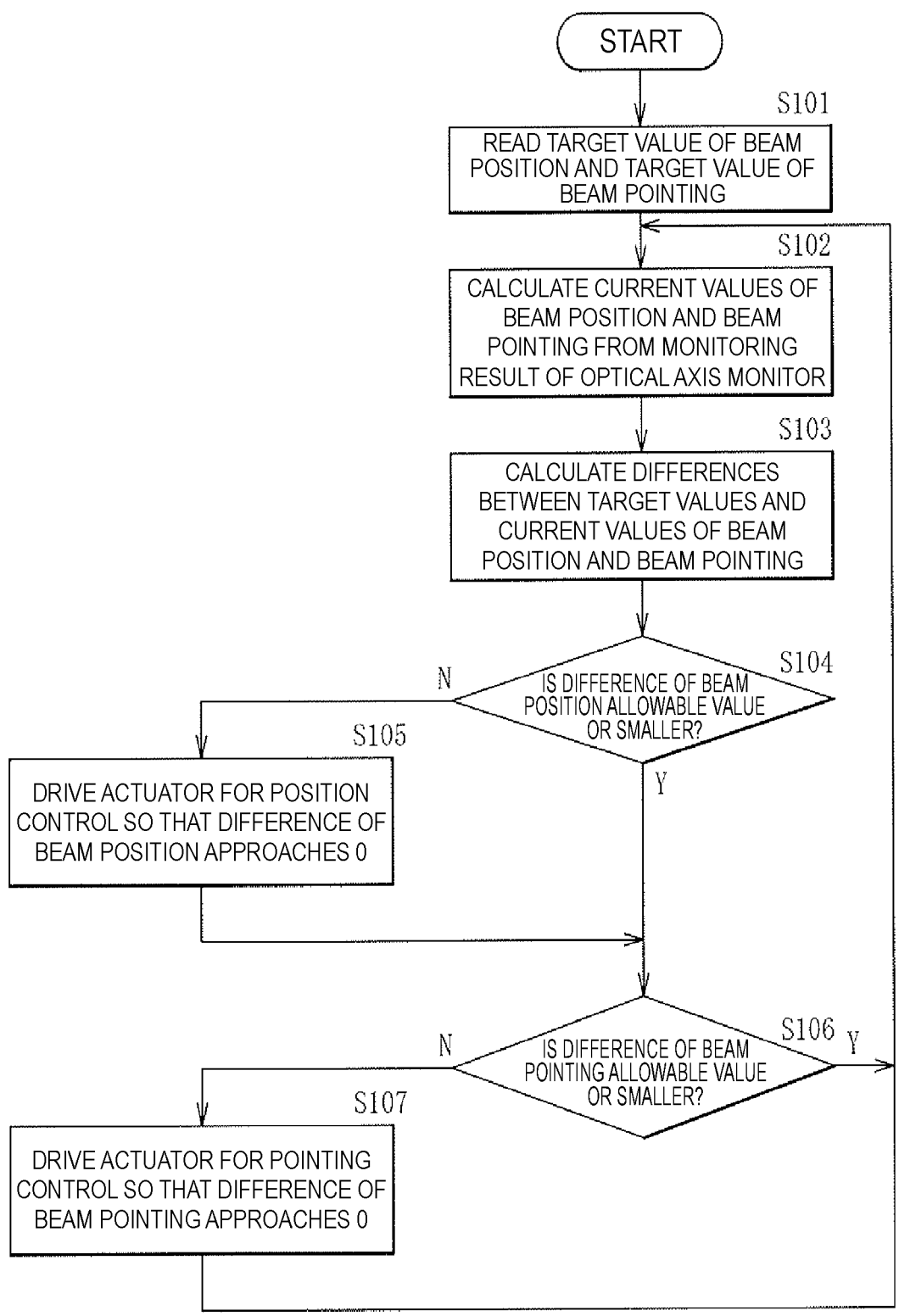
FIG. 8 schematically illustrates a flowchart of an operation of optical axis control in the laser apparatus according to a comparative example.

FIG. 8 schematically illustrates a flowchart of an operation of optical axis control in the laser apparatus 3 according to the comparative example. In the below description, an operation of the $n^{th}$ control unit 50-$n$ will be described as an example.

First, the control unit 50-$n$ reads a target value of the beam position and a target value of the beam pointing from the laser controller 51, for example (step S101).

Then, the control unit 50-$n$ calculates current values of the beam position and the beam pointing from a monitoring result of the optical axis monitor 81 (step S102).

Then, the control unit 50-$n$ calculates differences between the target values and the current values of the beam position and the beam pointing (step S103).

Then, the control unit 50-$n$ determines whether or not the difference of the beam position is an allowable value or smaller (step S104). When the control unit 50-$n$ determines that the difference of the beam position is larger than the allowable value (step S104; N), the control unit 50-$n$ then proceeds to the processing of step S105. At step S105, the control unit 50-$n$ drives the actuator for position control of the actuator unit 70-$n$ so that the difference of the beam position approaches zero, and then proceeds to the process of step S106.

On the other hand, when the control unit 50-$n$ determines that the difference of the beam position is the allowable value or smaller (step S104; Y), the control unit 50-$n$ proceeds to the processing of step S106. At step S106, the control unit 50-$n$ determines whether or not the difference of the beam pointing is an allowable value or smaller. When the control unit 50-$n$ determines that the difference of the beam pointing is the allowable value or smaller (step S106; Y), the control unit 50-$n$ returns to the processing of step S102.

On the other hand, when the control unit 50-$n$ determines that the difference of the beam pointing is larger than the allowable value (step S106; N), the control unit 50-$n$ drives the actuator for pointing control of the actuator unit 70-$n$ so that the difference of the beam pointing approaches zero (step S107), and then returns to the process of step S102.

[2.3 Problem]

Figure 9:
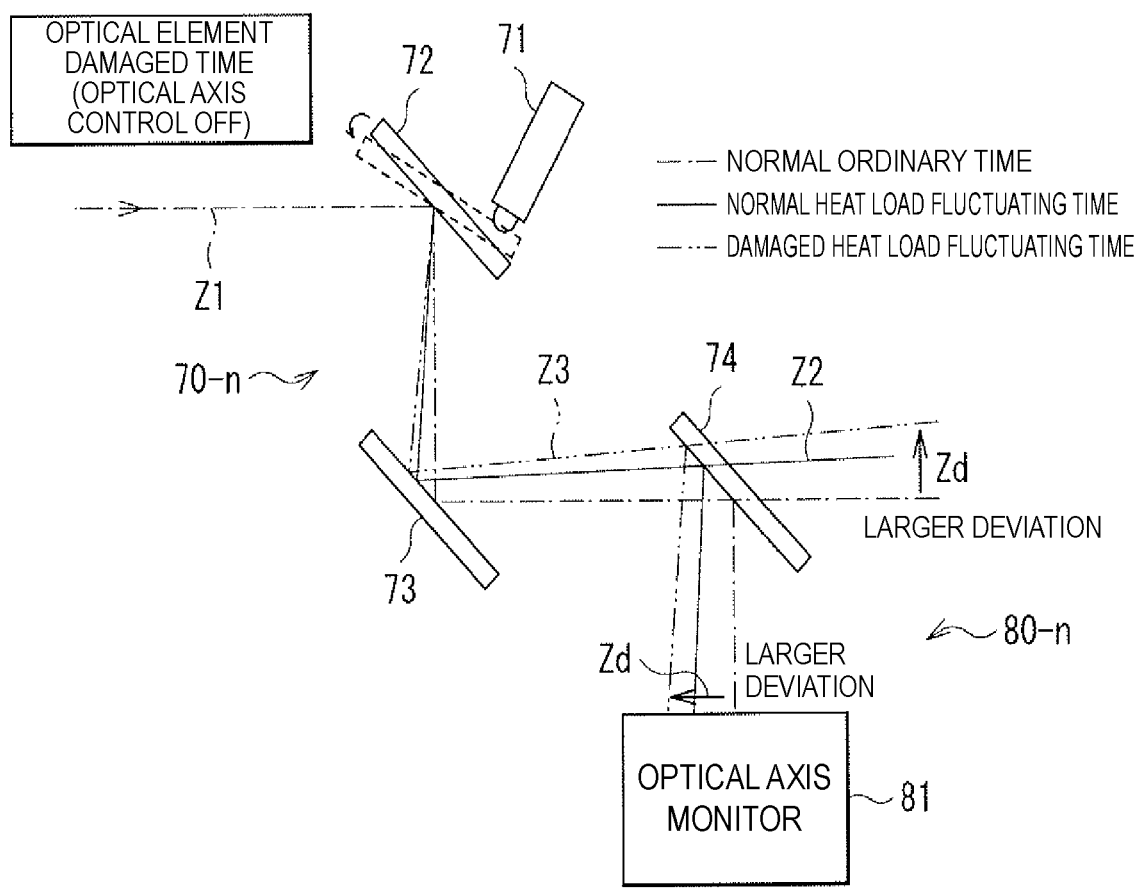
FIG. 9 schematically illustrates an exemplary state of a laser beam axis in the case where an optical element is damaged when optical axis control by an actuator is off, in the laser apparatus according to the comparative example.

FIG. 9 schematically illustrates an exemplary state of a laser beam axis in the case where an optical element is damaged when the optical axis control by the actuator 71 is off, in the laser apparatus 3 according to the comparative example. Here, an optical element is the reflective mirror 72, for example.

FIG. 9 illustrates the laser beam axis Z1 in the ordinary state, the laser beam axis Z2 in a normal heat load fluctuating time in which fluctuation is made because a heat load is generated in an optical element or the like, and the laser beam axis Z3 in a heat load fluctuating time when an optical element is damaged. As illustrated in FIG. 9, when an optical element is damaged, the damaged portion absorbs heat. Therefore, the optical element is affected by the head load more than the case of the normal heat load fluctuation. As a result, the optical axis deviation of the laser beam axis Z3, at the time when the optical element is damaged and the heat load fluctuates, is larger. Therefore, the optical axis deviation amount Zd relative to the laser beam axis Z1 in the ordinary time is increased.

Figure 10:
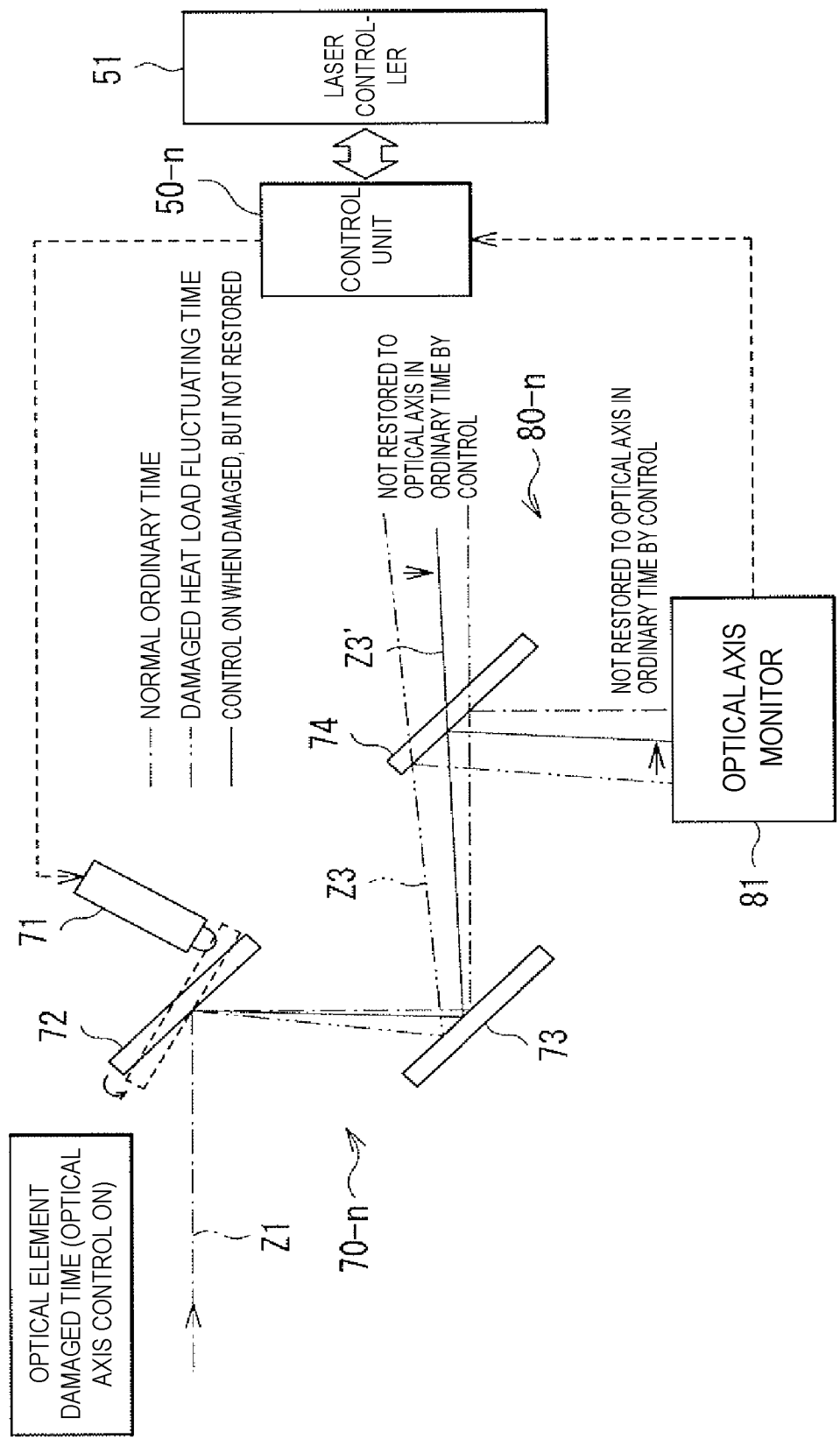
FIG. 10 schematically illustrates an exemplary state of a laser beam axis in the case where an optical element is damaged when optical axis control by an actuator is on, in the laser apparatus according to the comparative example.

FIG. 10 schematically illustrates an exemplary state of a laser beam axis in the case where an optical element is damaged when the optical axis control by the actuator 71 is on, in the laser apparatus 3 according to the comparative example. Here, an optical element is the reflective mirror 72, for example.

FIG. 10 illustrates the laser beam axis Z1 in the ordinary time, the laser beam axis Z3 in the time when the optical element is damaged and the heat load fluctuates, and a laser beam axis Z3' in which the optical axis control is turned on when the optical element is damaged but is not restored to the laser optical axis Z1 in the ordinary time.

When the optical element is damaged, the driving amount of the actuator 71 required for restoring the laser beam axis by the optical axis deviation amount Zd may be increased. In that case, the driving amount of the actuator 71 may exceed the driving allowable range. As a result, as illustrated in the laser beam axis Z3', the laser beam axis is not restored to the laser beam axis Z1 in the ordinary state even though the actuator 71 is driven. In that case, the laser beam axis is not stabilized, and in the EUV light generating system of FIG. 2, it is difficult to accurately irradiate the target 27 in the chamber 2 with the pulse laser beam 33. Thereby, it is difficult to generate EUV light normally. In that case, it may be necessary to find the damaged optical element and replace and restore it. However, in the EUV light generating system, since a large number of optical elements are used, it is not easy to quickly find the damaged optical element. It is desirable to develop a technique that enables a damaged optical element to be found quickly.

<3. First Embodiment> (Laser Apparatus Having Function of Determining Abnormality of Optical Element Based on Driving Amount of Actuator)

Next, a laser apparatus and an EUV light generating system according to a first embodiment of the present disclosure will be described. In the below description, components almost similar to those of the laser apparatus 3 and the EUV light generating system according to the comparative example are denoted by the same reference signs, and the description thereof is omitted as appropriate.

[3.1 Configuration]

Figure 11:
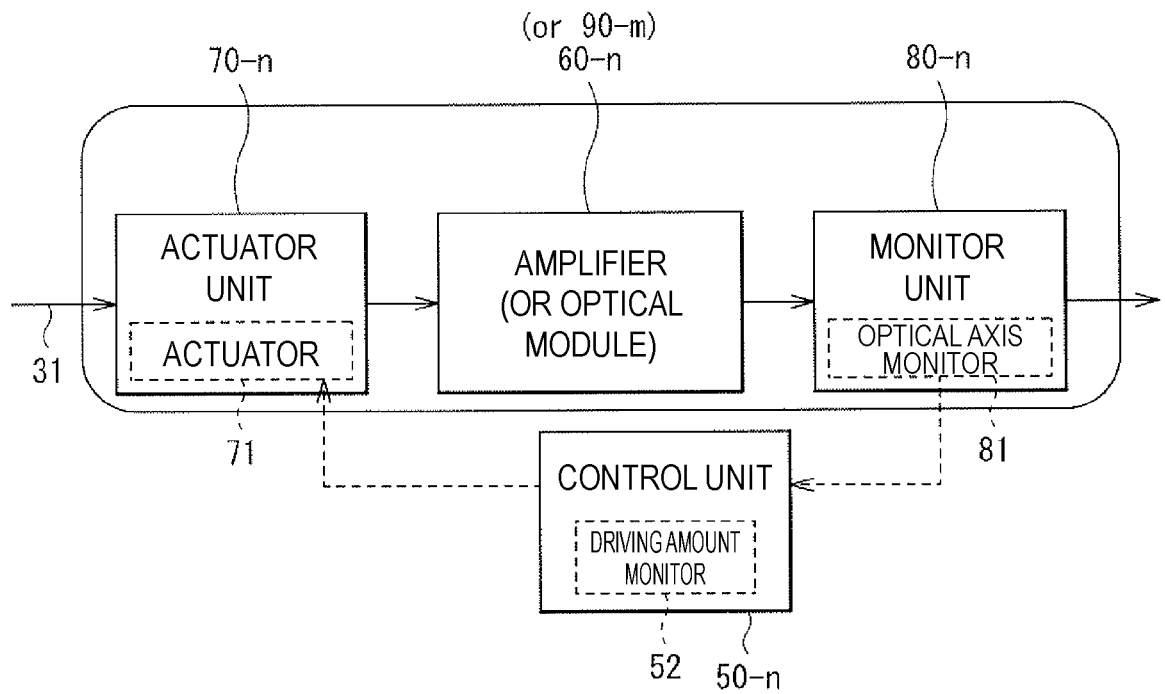
FIG. 11 schematically illustrates a first exemplary configuration of one optical unit in a laser apparatus according to a first embodiment.
Figure 12:
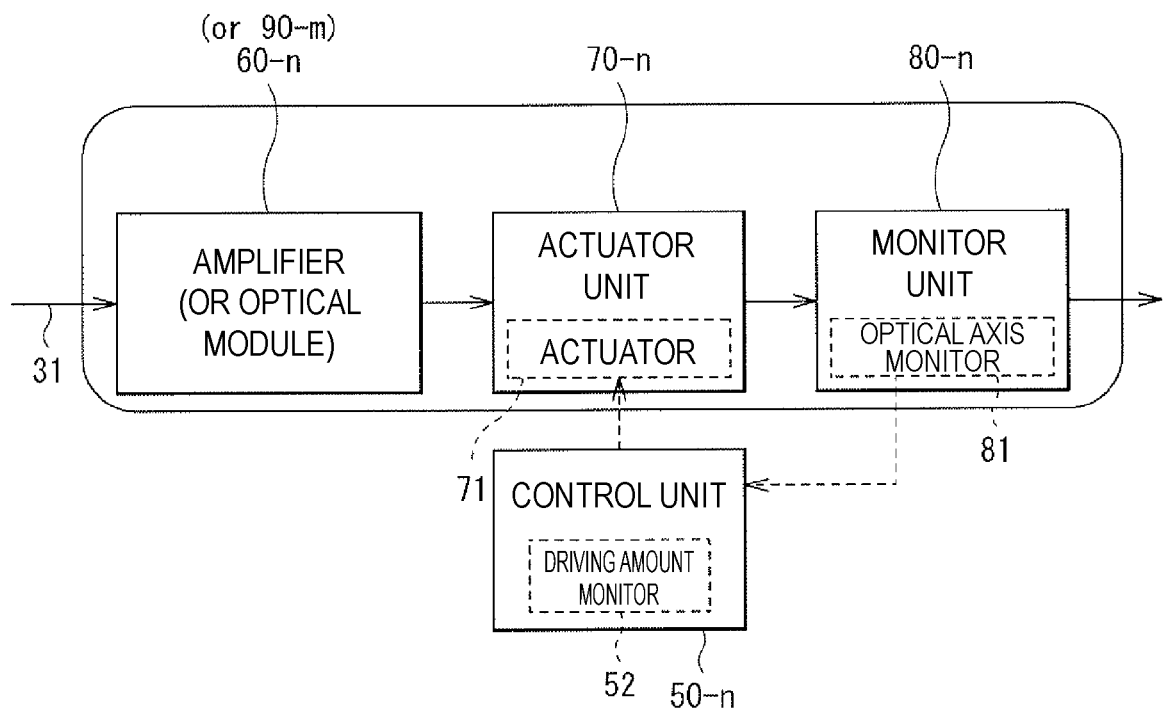
FIG. 12 schematically illustrates a second exemplary configuration of one optical unit in the laser apparatus according to the first embodiment.

FIG. 11 schematically illustrates a first exemplary configuration of one optical unit in a laser apparatus according to the first embodiment. FIG. 12 schematically illustrates a second exemplary configuration of one optical unit in the laser apparatus according to the first embodiment.

In the laser apparatus according to the first embodiment, the control unit 50-$n$ may have a configuration further including a driving amount monitor 52 that monitors the driving amount of the actuator 71, with respect to the configuration of the control unit 50-$n$ in the comparative example illustrated in FIGS. 3 and 4.

Here, the driving amount of the actuator 71 may be a control amount of driving the actuator 71. The driving amount of the actuator 71 may be the number of steps when the control unit 50-$n$ controls driving of the actuator 71.

The control unit 50-$n$ may be a control unit that controls the actuator 71 based on the monitoring result of the optical axis monitor 81 and determines abnormality of an optical element based on the monitoring result of the driving amount monitor 52.

The control unit 50-$n$ may determine abnormality of an optical element based on an integrated value of the driving amount when the actuator 71 is sequentially driven. For example, the control unit 50-$n$ may determine that an optical element is abnormal when the integrated value of the driving amount exceeds a threshold. Alternatively, the control unit 50-$n$ may determine that an optical element is abnormal based on a differential value of the driving amount when the actuator 71 is sequentially driven. For example, the control unit 50-*n* may determine that an optical element is abnormal when the differential value of the driving amount exceeds a threshold.

The other configurations may be almost similar to those of the laser apparatus 3 and the EUV light generating system according to the comparative example.

[3.2 Operation]

Figure 13:
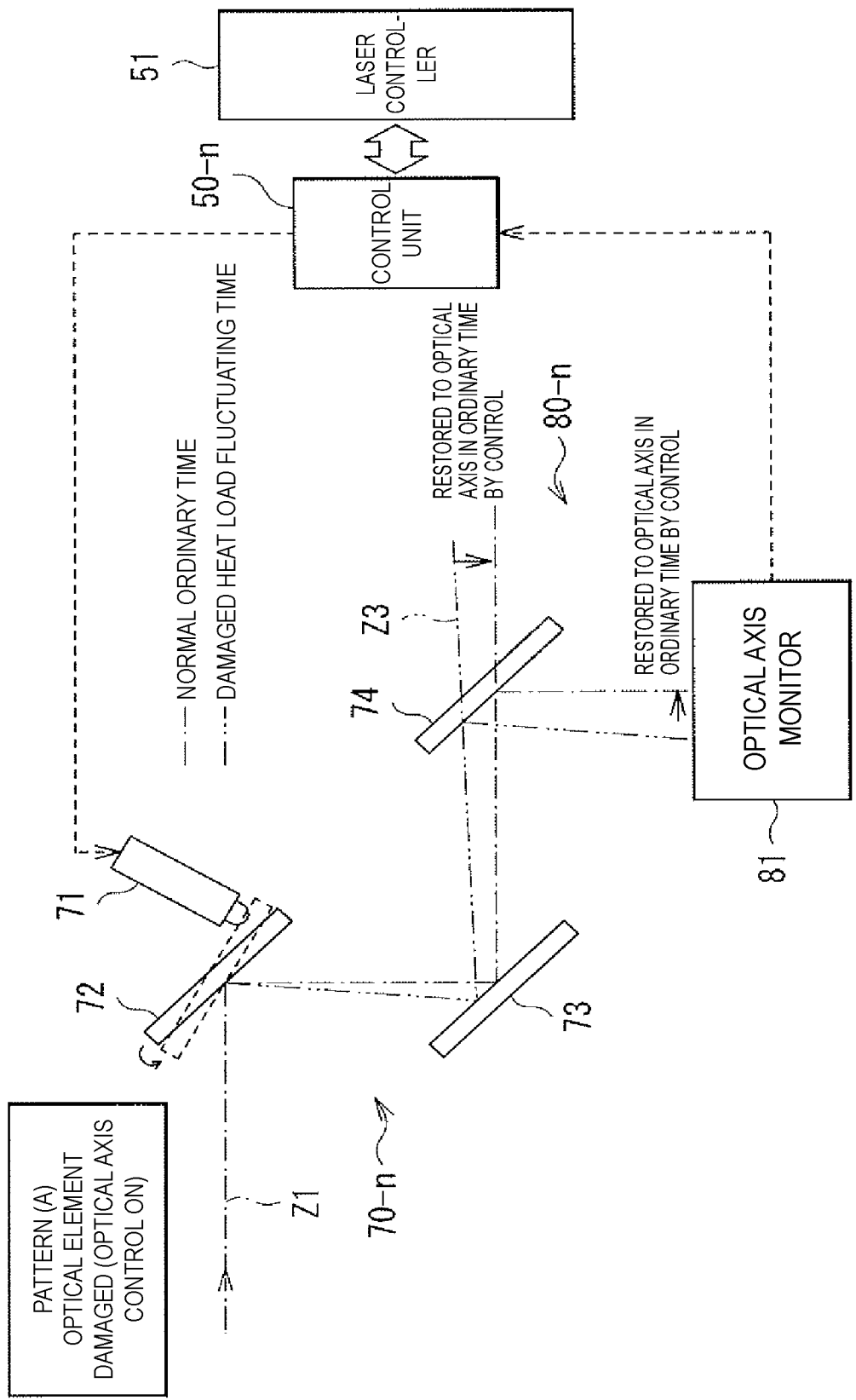
FIG. 13 schematically illustrates a first exemplary state of a laser beam axis in the case where an optical element is damaged when optical axis control by an actuator is on, in the laser apparatus according to the first embodiment.

FIG. 13 schematically illustrates a first exemplary state of a laser beam axis in the case where an optical element is damaged when the optical axis control by the actuator 71 is on, in the laser apparatus according to the first embodiment. Here, an optical element is the reflective mirror 72, for example.

FIG. 13 illustrates the laser beam axis Z1 in the ordinary time and the laser beam axis Z3 in the time when an optical element is damaged and the heat load fluctuates. When an optical element is damaged, it is affected by the heat load larger than the case of normal heat load fluctuation. As a result, since the damaged portion absorbs heat, the optical axis is deviated in a larger amount. When the optical axis deviation amount Zd is within the driving range of the actuator 71, it is possible to restore the optical axis to a state that is the same as the laser beam axis Z1 in the ordinary time. However, in order to restore the optical axis, it is necessary to have a larger driving amount compared with the driving amount of the actuator 71 in the time of normal heat load fluctuation.

Figure 15:
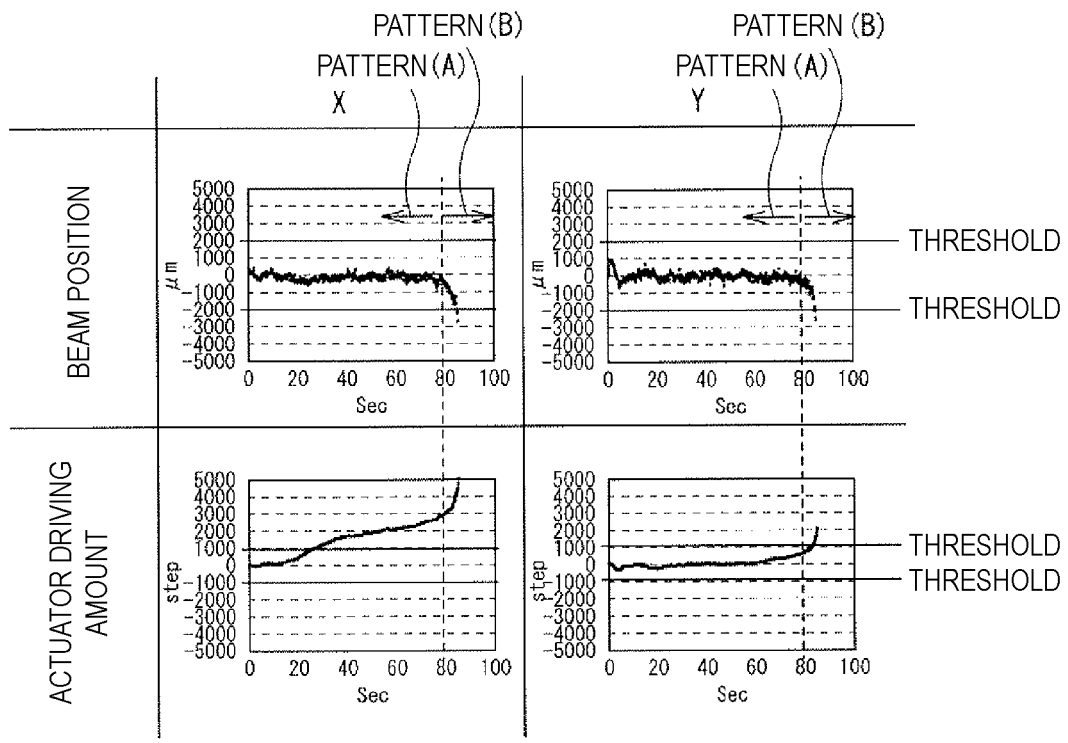
FIG. 15 schematically illustrates examples of measured values of the beam position and a drive amount of an actuator for position control in one optical unit of the laser apparatus according to the first embodiment.
Figure 16:
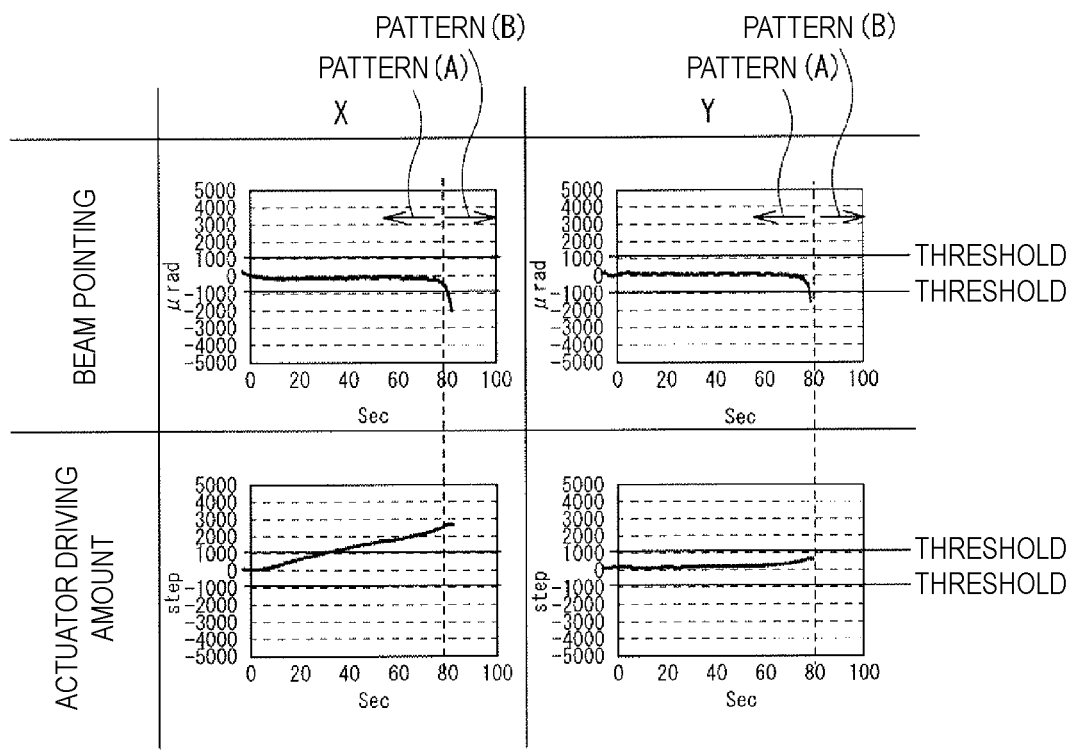
FIG. 16 schematically illustrates examples of measured values of beam pointing and a driving amount of an actuator for pointing control in one optical unit of the laser apparatus according to the first embodiment.

Note that the state of the laser beam axis illustrated in FIG. 13 is referred to as a pattern (A), and FIGS. 15 and 16 illustrate states corresponding to the pattern (A).

Figure 14:
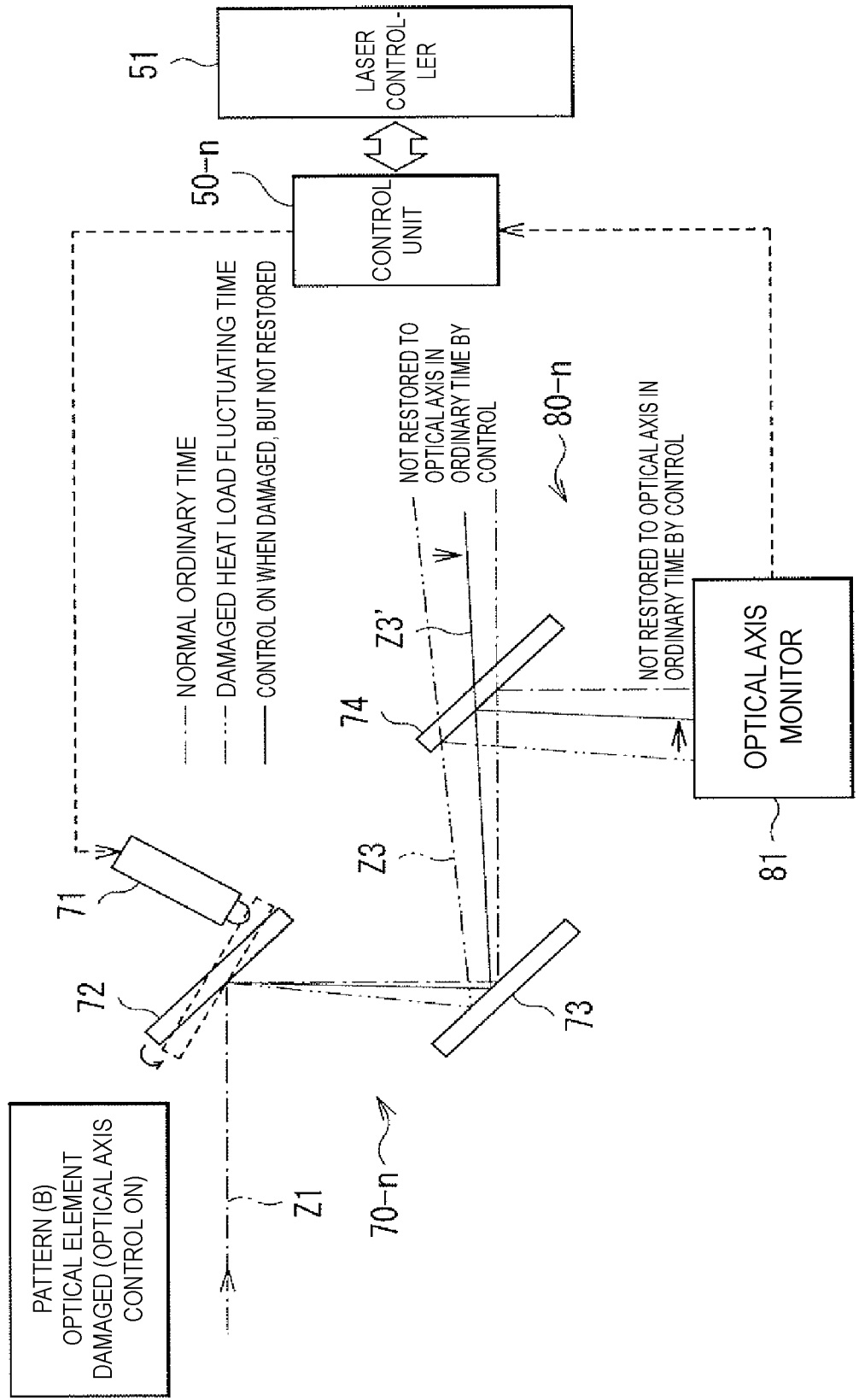
FIG. 14 schematically illustrates a second exemplary state of a laser beam axis in the case where an optical element is damaged when optical axis control by an actuator is on, in the laser apparatus according to the first embodiment.

FIG. 14 schematically illustrates a second exemplary state of a laser beam axis in the case where an optical element is damaged when the optical axis control by the actuator 71 is on, in the laser apparatus according to the first embodiment. Here, an optical element is the reflective mirror 72, for example.

FIG. 14 illustrates the laser beam axis Z1 in the ordinary time, the laser beam axis Z3 in the time when an optical element is damaged and the heat load fluctuates, and the laser beam axis Z3' that is not restored to the laser beam axis Z1 in the ordinary time even though optical axis control is turned on when the optical element is damaged.

When the optical axis deviation amount Zd exceeds the driving range of the actuator 71, the driving amount becomes larger compared with the driving amount of the actuator 71 in the normal heat load fluctuating time, and further, the optical axis position detected by the optical axis monitor 81 is also deviated from the optical axis position in the ordinary time.

Note that the state of the laser beam axis illustrated in FIG. 14 is referred to as a pattern (B), and FIGS. 15 and 16 described below illustrate states corresponding to the pattern (B).

FIG. 15 schematically illustrates examples of measured values of the beam position and the driving amount of an actuator for position control in one optical unit of the laser apparatus according to the first embodiment. Note that the measured values in FIG. 15 correspond to the case of displacing the beam position of the laser beam axis by displacing the reflective mirror 72 in FIGS. 13 and 14 by an actuator for position control, for example.

FIG. 15 shows the beam position in an X direction and a Y direction orthogonal to each other in a plane that is orthogonal to the laser beam axis of the pulse laser beam 31, and the driving amount of an actuator for position control that controls the beam position in the X direction and the Y direction. In the graph showing the beam position of FIG. 15, the horizontal axis shows the time and the vertical axis shows the beam position. The unit of time is second, and the unit of beam position is μm. In the graph showing the driving amount of an actuator for position control of FIG. 15, the horizontal axis shows the time and the vertical axis shows the driving amount. The unit of time is second, and the unit of driving amount of the actuator for position control is the number of steps.

FIG. 16 schematically illustrates examples of measured values of the beam pointing and the driving amount of an actuator for pointing control in one optical unit of the laser apparatus according to the first embodiment. Note that the measured values in FIG. 16 correspond to the case of displacing the beam pointing of the laser beam axis by displacing the reflective mirror 73 in FIGS. 13 and 14 by an actuator for pointing control, for example.

FIG. 16 illustrates beam pointing in an X direction and a Y direction orthogonal to each other in a plane that is orthogonal to the laser beam axis of the pulse laser beam 31, and the driving amount of an actuator for pointing control that controls the beam pointing in the X direction and the Y direction. In the graph showing the beam pointing of FIG. 16, the horizontal axis shows the time, and the vertical axis shows the beam pointing. The unit of time is second, and the unit of beam pointing is an angle μrad). In the graph showing the driving amount of an actuator for pointing control of FIG. 16, the horizontal axis shows the time and the vertical axis shows the driving amount. The unit of time is second, and the unit of driving amount of the actuator for pointing control is the number of steps.

In the examples of FIGS. 15 and 16, the state is changed from the pattern (A) to the pattern (B) in eighty seconds from the start of oscillation of the laser apparatus, which exceeds the optical axis controllable range by the actuator 71. In the examples of FIGS. 15 and 16, fluctuation is larger particularly in the X direction.

The control unit 50-*n* may set a threshold for each of an integrated value of the driving amount of the actuator for position control and an integrated value of the driving amount of the actuator for pointing control, and perform abnormality determination operation illustrated in FIG. 18 described below.

Alternatively, the control unit 50-*n* may set a threshold for each of a differential value of the driving amount of the actuator for position control and a differential value of the driving amount of the actuator for pointing control, and perform abnormality determination operation illustrated in FIG. 19 described below.

Alternatively, the control unit 50-*n* may perform abnormality determination operation based on both the integrated value of the driving amount and the differential value of the driving amount.

In the examples of FIGS. 15 and 16, a threshold of an integrated value of the driving amount may substantially range from ±1000 steps to ±3000 steps, for example. In the case where a variance component is superimposed on the driving amount, it is also possible to perform determination with use of a threshold of a moving average of the integrated value of the driving amount. Alternatively, a threshold of a differential value of the driving amount may substantially range from ±100 step/sec to 200 step/sec. The case where these thresholds are exceeded may be determined to be "abnormal". In the case where a variance component is superimposed on the driving amount, it is also possible to perform determination by a differential value of the moving average of the driving amount.

(First Example of Abnormality Determination Operation by Control Unit 50-*n*)

Figure 18:
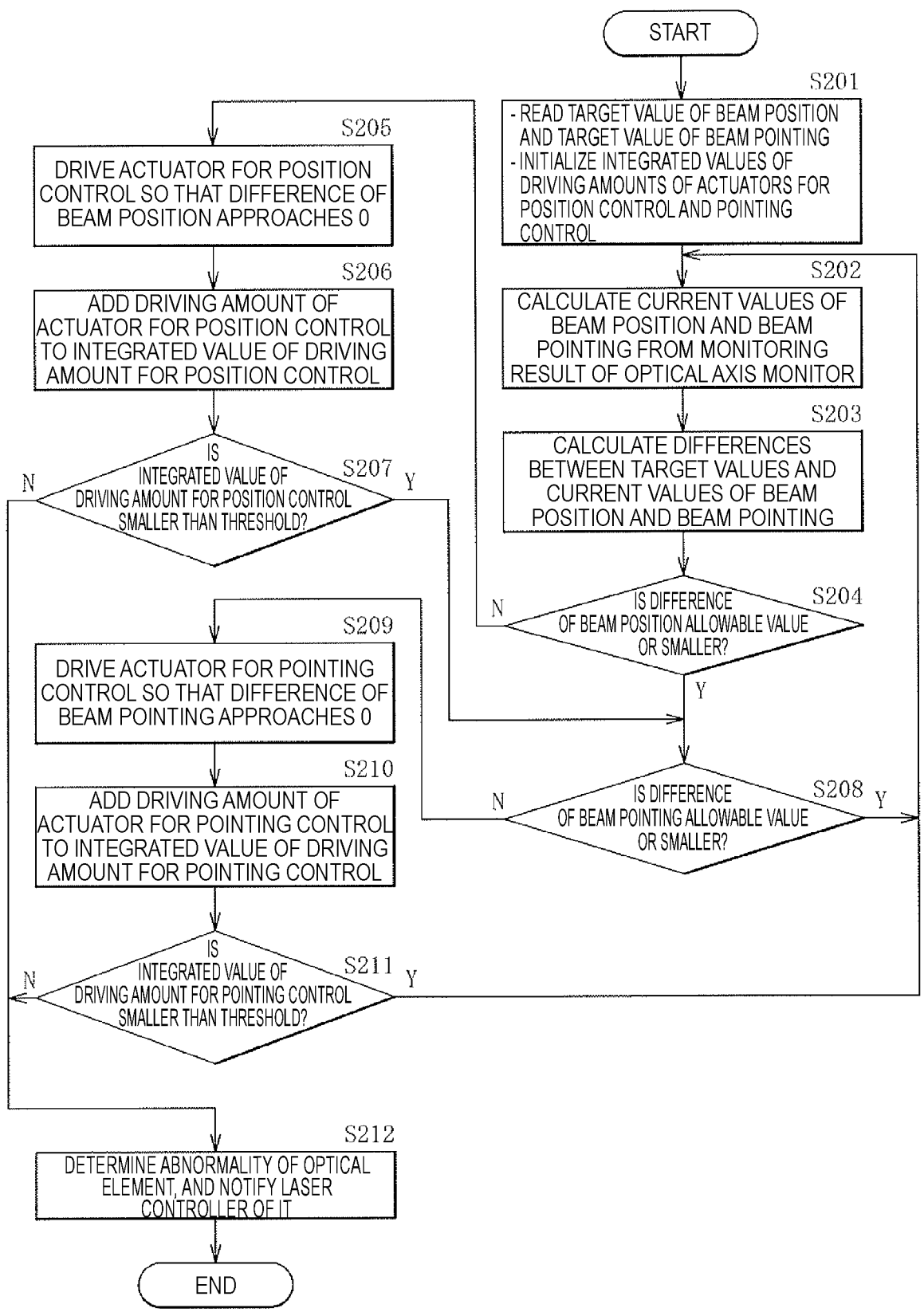
FIG. 18 schematically illustrates a first example of a flowchart of an abnormality determination operation by a control unit in the laser apparatus according to the first embodiment.

FIG. 18 schematically illustrates a first example of a flowchart of an abnormality determination operation by the control unit 50-*n* in the laser apparatus according to the first embodiment. In the below description, an operation of the n$^{th}$ control unit 50-*n* will be described as an example.

First, the control unit 50-*n* reads a target value of the beam position and a target value of the beam pointing from the laser controller 51, for example (step S201). Also, the control unit 50-*n* initializes the integrated values of the driving amounts of the actuators for position control and for pointing control of the actuator unit 70-*n* at step S201.

Then, the control unit 50-*n* calculates current values of the beam position and the beam pointing from the monitoring result of the optical axis monitor 81 (step S202).

Then, the control unit 50-*n* calculates differences between the target values and the current values of the beam position and the beam pointing (step S203).

Then, the control unit 50-*n* determines whether or not the difference of the beam position is an allowable value or smaller (step S204). When the control unit 50-*n* determines that the difference of the beam position is larger than the allowable value (step S204; N), the control unit 50-*n* then proceeds to the processing of steps S205 to S207. On the other hand, when the control unit 50-*n* determines that the difference of the beam position is the allowable value or smaller (step S204; Y), the control unit 50-*n* proceeds to the processing of step S208.

At step S205, the control unit 50-*n* drives the actuator for position control of the actuator unit 70-*n* so that the difference of the beam position approaches zero. Then, the control unit 50-*n* adds the driving amount of the actuator for position control of the actuator unit 70-*n* to the integrated value of the driving amount for position control (step S206). Then, the control unit 50-*n* determines whether or not the integrated value of the driving amount for position control is smaller than a threshold (step S207).

When the control unit 50-*n* determines that the integrated value of the driving amount for position control is smaller than the threshold (step S207; Y), the control unit 50-*n* proceeds to the processing of step S208. On the other hand, when the control unit 50-*n* determines that the integrated value of the driving amount for position control is not smaller than the threshold (step S207; N), the control unit 50-*n* determines that an optical element is abnormal, notifies the laser controller 51 of the fact (step S212), and ends the processing.

At step S208, the control unit 50-*n* determines whether or not the difference of the beam pointing is an allowable value or smaller. When the control unit 50-*n* determines that the difference of the beam pointing is the allowable value or smaller (step S208; Y), the control unit 50-*n* returns to the processing of step S202.

On the other hand, when the control unit 50-*n* determines that the difference of the beam pointing is larger than the allowable value (step S208; N), the control unit 50-*n* drives the actuator for pointing control of the actuator unit 70-*n* so that the difference of the beam pointing approaches zero (step S209). Then, the control unit 50-*n* adds the driving amount of the actuator for pointing control of the actuator unit 70-*n* to the integrated value of the driving amount for pointing control (step S210). Then, the control unit 50-*n* determines whether or not the integrated value of the driving amount for pointing control is smaller than a threshold (step S211).

When the control unit 50-*n* determines that the integrated value of the driving amount for pointing control is smaller than the threshold (step S211; Y), the control unit 50-*n* returns to the processing of step S202. On the other hand, when the control unit 50-*n* determines that the integrated value of the driving amount for pointing control is not smaller than the threshold (step S211; N), the control unit 50-*n* determines that an optical element is abnormal, notifies the laser controller 51 of the fact (step S212), and ends the processing.

(Second Example of Abnormality Determination Operation by Control Unit 50-*n*)

Figure 19:
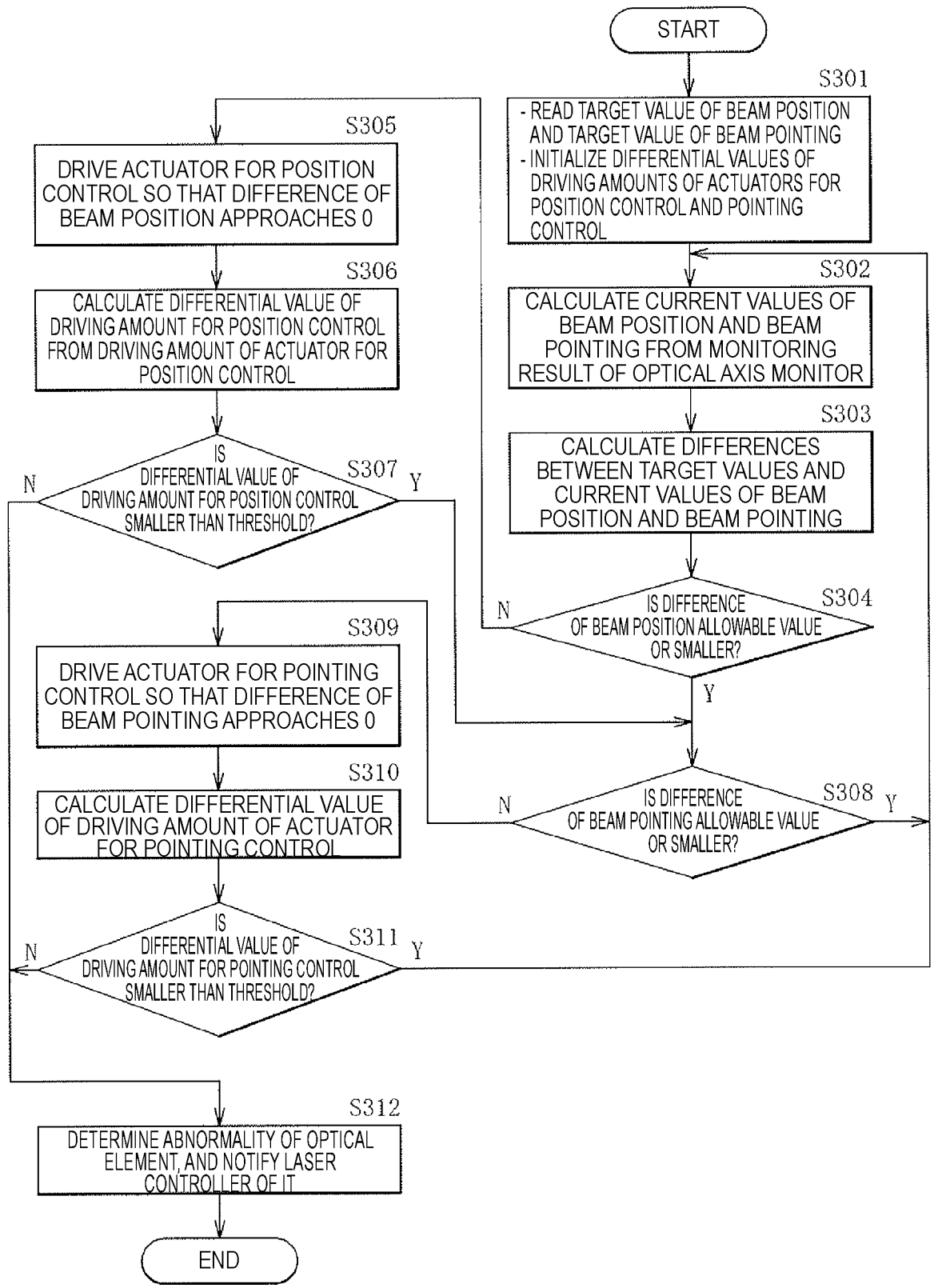
FIG. 19 schematically illustrates a second example of a flowchart of an abnormality determination operation by the control unit in the laser apparatus according to the first embodiment.

FIG. 19 schematically illustrates a second example of a flowchart of an abnormality determination operation by the control unit in the laser apparatus according to the first embodiment. In the below description, an operation of the n$^{th}$ control unit 50-*n* will be described as an example.

First, the control unit 50-*n* reads a target value of the beam position and a target value of the beam pointing from the laser controller 51, for example (step S301). Also, the control unit 50-*n* initializes differential values of the driving amounts of the actuators for position control and for pointing control of the actuator unit 70-*n* at step S301.

Then, the control unit 50-*n* calculates current values of the beam position and the beam pointing from the monitoring result of the optical axis monitor 81 (step S302).

Then, the control unit 50-*n* calculates differences between the target values and the current values of the beam position and the beam pointing (step S303).

Then, the control unit 50-*n* determines whether or not the difference of the beam position is an allowable value or smaller (step S304). When the control unit 50-*n* determines that the difference of the beam position is larger than the allowable value (step S304; N), the control unit 50-*n* then proceeds to the processing of steps S305 to S307. On the other hand, when the control unit 50-*n* determines that the difference of the beam position is the allowable value or smaller (step S304; Y), the control unit 50-*n* proceeds to the processing of step S308.

At step S305, the control unit 50-*n* drives the actuator for position control of the actuator unit 70-*n* so that the difference of the beam position approaches zero. Then, the control unit 50-*n* calculates a differential value of the driving amount for position control from the driving amount of the actuator for position control of the actuator unit 70-*n* (step S306). Then, the control unit 50-*n* determines whether or not the differential value of the driving amount for position control is smaller than a threshold (step S307).

When the control unit 50-*n* determines that the differential value of the driving amount for position control is smaller than the threshold (step S307; Y), the control unit 50-*n* proceeds to the processing of step S308. On the other hand, when the control unit 50-*n* determines that the differential value of the driving amount for position control is not smaller than the threshold (step S307; N), the control unit 50-*n* determines that an optical element is abnormal, notifies the laser controller 51 of the fact (step S312), and ends the processing.

At step S308, the control unit 50-*n* determines whether or not the difference of the beam pointing is an allowable value or smaller. When the control unit 50-*n* determines that the difference of the beam pointing is the allowable value or smaller (step S308; Y), the control unit 50-*n* returns to the processing of step S302.

On the other hand, when the control unit 50-*n* determines that the difference of the beam pointing is larger than the allowable value (step S308; N), the control unit 50-*n* drives the actuator for pointing control of the actuator unit 70-n so that the difference of the beam pointing approaches zero (step S309). Then, the control unit 50-n calculates the differential value of the driving amount for pointing control, from the driving amount of the actuator for pointing control of the actuator unit 70-n (step S310). Then, the control unit 50-n determines whether or not the differential value of the driving amount for pointing control is smaller than a threshold (step S311).

When the control unit 50-n determines that the differential value of the driving amount for pointing control is smaller than the threshold (step S311; Y), the control unit 50-n returns to the processing of step S302. On the other hand, when the control unit 50-n determines that the differential value of the driving amount for pointing control is not smaller than the threshold (step S311; N), the control unit 50-n determines that an optical element is abnormal, notifies the laser controller 51 of the fact (step S312), and ends the processing.

(Abnormality Determination Operation by Laser Controller 51)

Figure 17:
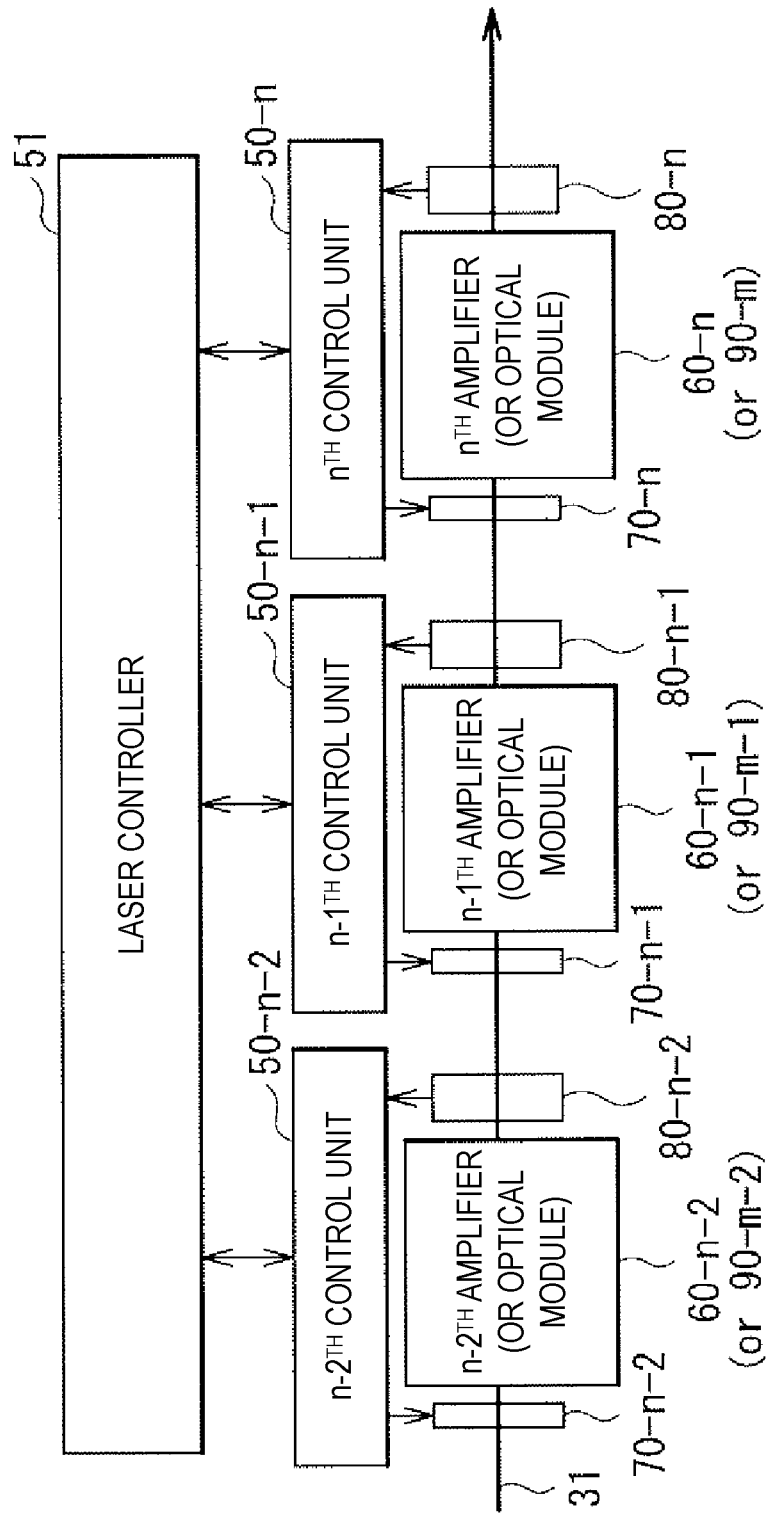
FIG. 17 schematically illustrates an exemplary configuration of a plurality of optical units in the laser apparatus according to the first embodiment.

FIG. 17 schematically illustrates an exemplary configuration of a plurality of optical units in the laser apparatus according to the first embodiment.

In the case where a plurality of optical units are included, a control unit as a local control unit may be provided to a set of the driving amount monitor 52, the actuator 71, and the optical axis monitor 81 of each optical unit.

The laser controller 51 as a supervisory control unit identifies an abnormal optical element among the optical elements, based on a determination result of each local control unit. At that time, when it is determined that the driving amounts of two or more actuators 71 are abnormal, the laser controller 51 may identify that abnormality has occurred in an optical element provided on the most upstream side, of the optical elements corresponding to the two or more actuators 71.

In the below description, it is assumed that n and k represent positive integers, and components of the respective optical units are expressed as the n-$k^{th}$, ..., the n-$2^{th}$, the n-$1^{th}$, and the $n^{th}$, from the optical unit on the upstream side toward the optical unit on the downstream side of the pulse laser beam 31, for example. Basically, n>k is satisfied, and it is assumed that there is no component that satisfies n≤k. In that case, the $n^{th}$ optical unit is an optical unit on the most downstream side.

In the exemplary configuration of FIG. 17, when a determination result as described below is obtained in each control unit, the laser controller 51 can determine that damage of an optical element has occurred within a range between the optical axis monitor 81 of the n-$1^{th}$ monitor unit 80-n-1 and the optical axis monitor 81 of the $n^{th}$ monitor unit 80-n.

Determination result by the n-$2^{th}$ control unit 50-n-2: normal,

Determination result by the n-$1^{th}$ control unit 50-n-1: normal,

Determination result by the $n^{th}$ control unit 50-n: abnormal

In the exemplary configuration of FIG. 17, when a determination result as described below is obtained in each control unit, the laser controller 51 can determine that damage of an optical element has occurred within a range between the optical axis monitor 81 of the n-$2^{th}$ monitor unit 80-n-2 and the optical axis monitor 81 of the n-$1^{th}$ monitor unit 80-n-1. That is, it can be determined that damage of an optical element has occurred in the site on the most upstream side, in the sites determined to be abnormal.

Determination result by the n-$2^{th}$ control unit 50-n-2: normal,

Determination result by the n-$1^{th}$ control unit 50-n-1: abnormal,

Determination result by the $n^{th}$ control unit 50-n: abnormal

Figure 20:
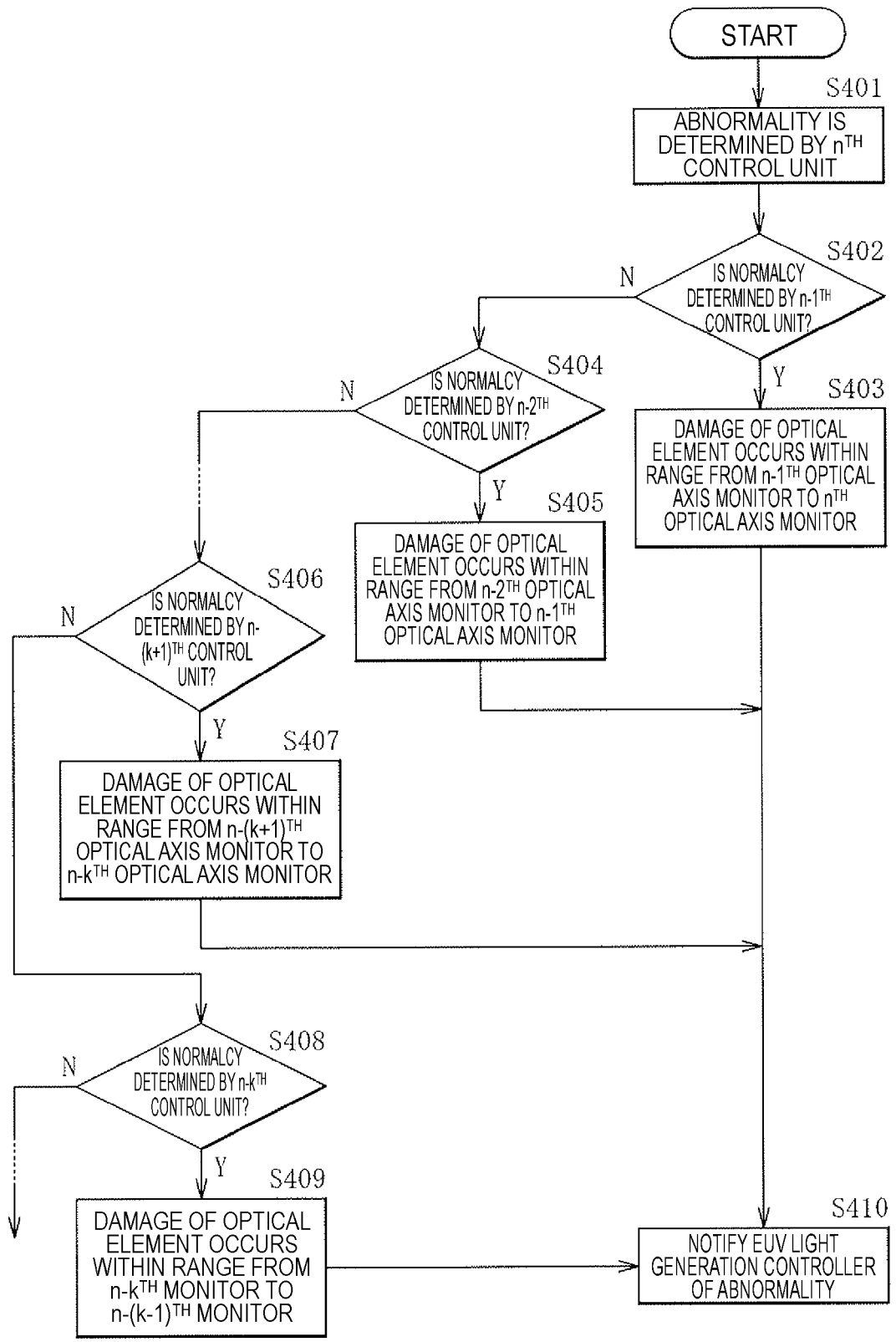
FIG. 20 schematically illustrates an example of a flowchart of an abnormality determination operation by a laser controller in the laser apparatus according to the first embodiment.

Hereinafter, an example of abnormality determination operation by the laser controller 51 will be described with reference to FIG. 20. FIG. 20 schematically illustrates an example of a flowchart of an abnormality determination operation by the laser controller 51 in the laser apparatus according to the first embodiment.

In the below description, the case where it is determined to be abnormal by at least the $n^{th}$ control unit 50-n will be described as an example.

When abnormality has been determined by the $n^{th}$ control unit 50-n (step S401), the laser controller 51 then determines whether or not normalcy has been determined by the n-$1^{th}$ control unit 50-n-1 (step S402).

When normalcy has been determined by the n-$1^{th}$ control unit 50-n-1 (step S402; Y), the laser controller 51 determines that damage of an optical element has occurred within a range between the optical axis monitor 81 of the n-$1^{th}$ monitor unit 80-n-1 and the optical axis monitor 81 of the $n^{th}$ monitor unit 80-n (step S403), and notifies the EUV light generation controller 5 of the fact (step S410).

On the other hand, when abnormality has been determined by the n-$1^{th}$ control unit 50-n-1 (step S402; N), the laser controller 51 then determines whether or not normalcy has been determined by the n-$2^{th}$ control unit 50-n-2 (step S404).

When normalcy has been determined by the n-$2^{th}$ control unit 50-n-2 (step S404; Y), the laser controller 51 determines that damage of an optical element has occurred within a range between the optical axis monitor 81 of the n-$2^{th}$ monitor unit 80-n-2 and the optical axis monitor 81 of the n-$1^{th}$ monitor unit 80-n-1 (step S405), and notifies the EUV light generation controller 5 of the fact (step S410).

On the other hand, when abnormality has been determined by the n-$2^{th}$ control unit 50-n-2 (step S404; N), the laser controller 51 then performs similar processing up to the n-(k+1)$^{th}$ control unit 50-n-(k+1), and determines whether or not normalcy has been determined by the n-(k+1)$^{th}$ control unit 50-n-(k+1) (step S406).

When normalcy has been determined by the n-(k+1)$^{th}$ control unit 50-n-(k+1) (step S406; Y), the laser controller 51 determines that damage of an optical element has occurred within a range between the optical axis monitor 81 of the n-(k+1)$^{th}$ monitor unit 80-n-(k+1) and the optical axis monitor 81 of the n-$k^{th}$ monitor unit 80-n-k (step S407), and notifies the EUV light generation controller 5 of the fact (step S410).

On the other hand, when abnormality has been determined by the n-(k+1)$^{th}$ control unit 50-n-(k+1) (step S406; N), the laser controller 51 then determines whether or not normalcy has been determined by the n-$k^{th}$ control unit 50-n-k (step S408).

When normalcy has been determined by the n-$k^{th}$ control unit 50-n-k (step S408; Y), the laser controller 51 determines that damage of an optical element has occurred within a range between the optical axis monitor 81 of the n-$k^{th}$ monitor unit 80-n-k and the optical axis monitor 81 of the n-(k−1)$^{th}$ monitor unit 80-n-(k−1) (step S409), and notifies the EUV light generation controller 5 of the fact (step S410).

On the other hand, when abnormality has been determined by the n-k$^{th}$ control unit 50-*n-k* (step S408; N), the laser controller 51 then may perform similar processing up to the control unit of the most upstream side.

Through the abnormality determination operation as described above, the EUV light generation controller 5 that is notified of the abnormality may stop an emission trigger signal to the laser apparatus 3 to stop the operation of the laser apparatus 3. The EUV light generation controller 5 may also display information of the optical element in which abnormality is identified, on a display not illustrated. Thereby, the operator may check damage or the like of the optical element in which abnormality is identified. When there is damage or the like of the optical element, the operator may replace the optical element having the damage or the like.

The other operations may be almost similar to those of the laser apparatus 3 and the EUV light generating system 11 according to the comparative example.

[3.3 Effect]

According to the laser apparatus and the EUV light generating system of the first embodiment, each control unit controls the actuator 71 based on the monitoring result of the optical axis monitor 81, and also determines abnormality of an optical element based on the monitoring result of the driving amount monitor 52. Therefore, it is easy to identify a damaged optical element.

According to the laser apparatus of the first embodiment, it is possible to identify a range in which a damaged optical element exists. In the laser apparatus, in the case of a configuration that is replaceable by each optical unit, for example, all of the optical units within the range in which an optical element determined to be abnormal exists may be targets of replacement. Even in the case of the configuration in which components in an optical element are partially replaceable, since a range in which an abnormal optical element exists is identified, it is easy to find the abnormal optical element. Consequently, the laser apparatus can be restored early.

<4. Second Embodiment> (Laser Apparatus Having Function of Determining Abnormality of Optical Element Based on Driving Amount of Actuator and Monitoring Result of Optical Axis Monitor)

Next, a laser apparatus and an EUV light generating system according to a second embodiment of the present disclosure will be described. In the below description, parts almost similar to the components of the laser apparatus and the EUV light generating system according to the comparative example or the first embodiment are denoted by the same reference signs, and the description thereof is omitted as appropriate.

[4.1 Configuration and Operation]

Configuration of the laser apparatus and the EUV light generating system according to the second embodiment may be almost similar to the laser apparatus and the EUV light generating system according to the first embodiment. However, an operation of determining abnormality by each control unit such as the control unit 50-*n* is partially different as described below.

In the laser apparatus according to the second embodiment, each control unit such as the control unit 50-*n* determines abnormality of an optical element by referring to the beam position and the beam pointing that are monitoring results of the optical axis monitor 81, in addition to the monitoring result of the driving amount monitor 52.

(First Example of Abnormality Determination Operation by Control Unit 50-*n*)

Figure 21:
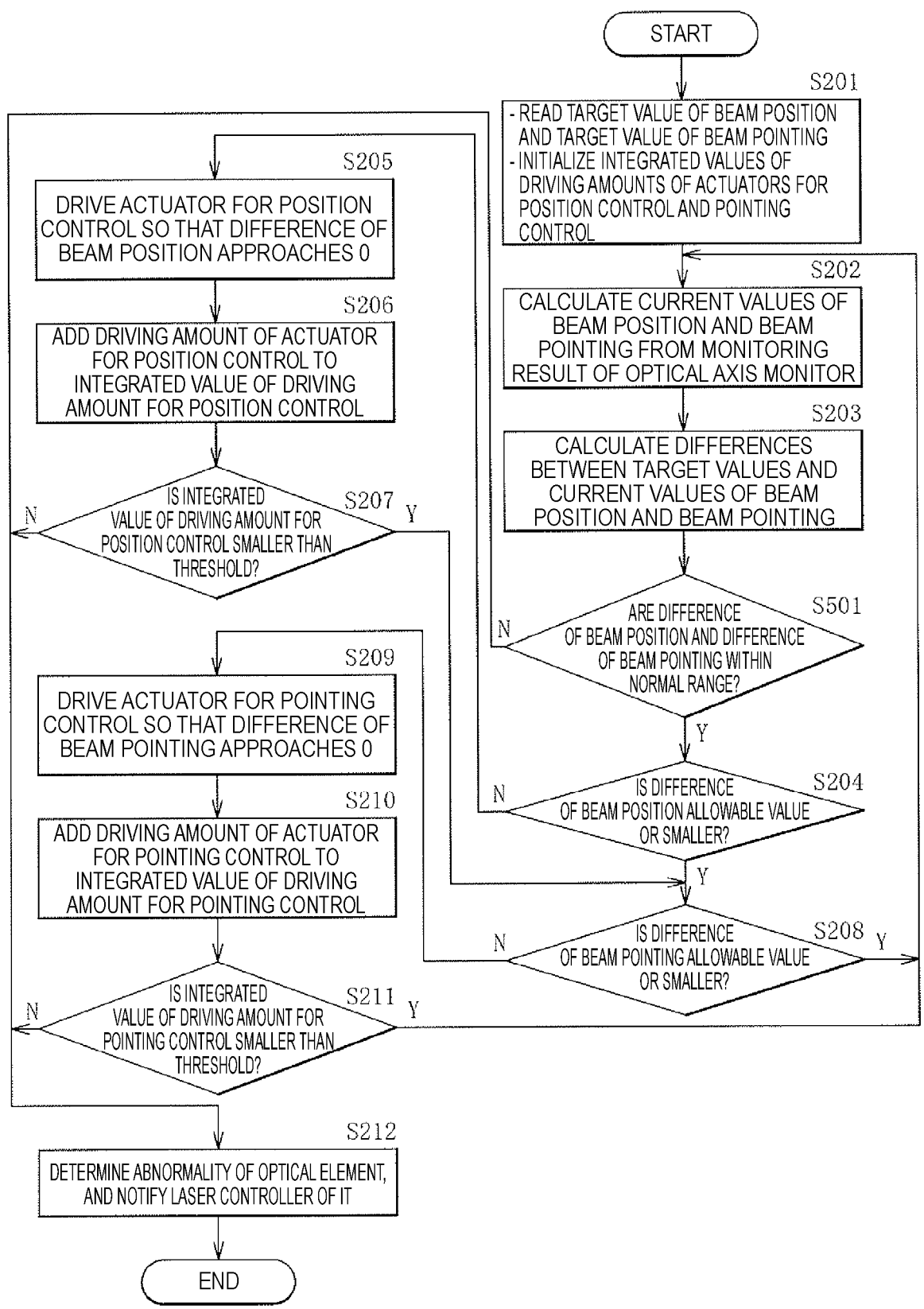
FIG. 21 schematically illustrates a first example of a flowchart of an abnormality determination operation by a control unit in a laser apparatus according to a second embodiment.

FIG. 21 schematically illustrates a first example of a flowchart of an abnormality determination operation by a control unit in the laser apparatus according to the second embodiment. In the below description, an operation of the n$^{th}$ control unit 50-*n* will be described as an example.

First, the control unit 50-*n* may perform processing almost similar to that of steps S201 to S203 of FIG. 18. Then, the control unit 50-*n* may determine whether or not the difference of the beam position and the difference of the beam pointing are within the normal range (step S501). Here, the normal range is set as a value larger than the allowable value. Determination at step S501 is performed by comparison between the target value and the monitoring result of the optical axis monitor 81.

When the control unit 50-*n* determines that the difference of the beam position and the difference of the beam pointing are not within the normal range (step S501; N), the control unit 50-*n* determines that an optical element is abnormal, notifies the laser controller 51 of the fact (step S212), and ends the processing.

On the other hand, when the control unit 50-*n* determines that the difference of the beam position and the difference of the beam pointing is within the normal range (step S501; Y), the control unit 50-*n* may perform processing almost similar to that of steps S204 to S211 of FIG. 18.

(Second Example of Abnormality Determination Operation by Control Unit 50-*n*)

Figure 22:
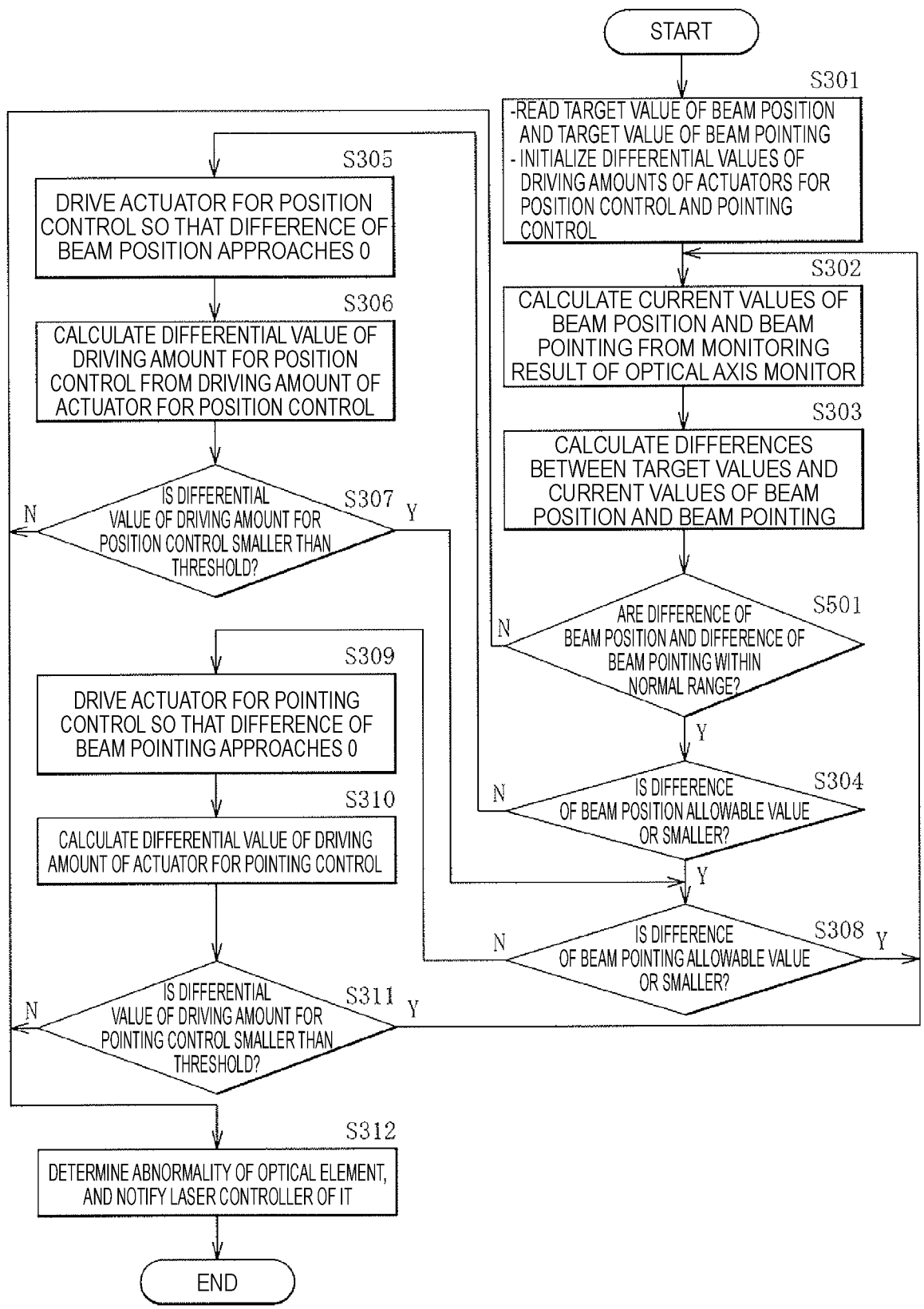
FIG. 22 schematically illustrates a second example of a flowchart of an abnormality determination operation by the control unit in the laser apparatus according to the second embodiment.

FIG. 22 schematically illustrates a second example of a flowchart of an abnormality determination operation by a control unit in the laser apparatus according to the second embodiment. In the below description, an operation of the n$^{th}$ control unit 50-*n* will be described as an example.

First, the control unit 50-*n* may perform processing almost similar to that of steps S301 to S303 of FIG. 19. Then, the control unit 50-*n* may determine whether or not the difference of the beam position and the difference of the beam pointing are within the normal range (step S501).

When the control unit 50-*n* determines that the difference of the beam position and the difference of the beam pointing are not within the normal range (step S501; N), the control unit 50-*n* determines that an optical element is abnormal, notifies the laser controller 51 of the fact (step S312), and ends the processing.

On the other hand, when the control unit 50-*n* determines that the difference of the beam position and the difference of the beam pointing are within the normal range (step S501; Y), the control unit 50-*n* may perform processing almost similar to that of steps S304 to S311 of FIG. 19.

The other operations may be almost similar to those of the laser apparatus and the EUV light generating system according to the comparative example or the first embodiment.

[4.2 Effect]

According to the laser apparatus and the EUV light generating system of the second embodiment, abnormality of an optical element is determined with reference to the monitoring result of the optical axis monitor 81 in addition to the driving amount of the actuator 71. Therefore, it is easier to identify a damaged optical element.

The other effects are almost similar to those of the laser apparatus and the EUV light generating system according to the first embodiment.

5. Others

The description provided above is intended to provide not limitations but just examples. Accordingly, it will be obvious to those skilled in the art that changes can be made to the embodiments of the present disclosure without departing from the scope of the accompanying claims.

The terms used in the present description and in the entire scope of the accompanying claims should be construed as terms "without limitations". For example, a term "including" or "included" should be construed as "not limited to that described to be included". A term "have" should be construed as "not limited to that described to be included". Moreover, an indefinite article "a/an" described in the present description and in the accompanying claims should be construed to mean "at least one" or "one or more".

What is claimed is:

1. A laser apparatus comprising:
an optical element disposed on a laser beam axis;
an actuator configured to displace the optical element to displace the laser beam axis;
a driving amount monitor configured to monitor a driving amount of the actuator;
an optical axis monitor disposed along the laser beam axis and configured to monitor the laser beam axis; and
a control unit configured to control the actuator based on a monitoring result of the optical axis monitor, and determine abnormality of the optical element based on a monitoring result of the driving amount monitor.

2. The laser apparatus according to claim 1, wherein
the control unit determines that the optical element is abnormal when an integrated value of the driving amount when the actuator is sequentially driven exceeds a threshold.

3. The laser apparatus according to claim 1, wherein
the control unit determines that the optical element is abnormal when a differential value of the driving amount when the actuator is sequentially driven exceeds a threshold.

4. The laser apparatus according to claim 1, further comprising
a plurality of the optical elements, a plurality of the actuators, a plurality of the driving amount monitors, and a plurality of the optical axis monitors, wherein
each of the actuators is provided for each of the optical elements,
each of the driving amount monitors is provided for each of the actuators,
each of the optical axis monitors is disposed along the laser beam axis on a downstream side of each of the optical elements, and
the control unit identifies an optical element in which abnormality has occurred among the optical elements, based on a monitoring result of each of the driving amount monitors.

5. The laser apparatus according to claim 4, wherein
the control unit includes a plurality of local control units and a supervisory control unit for the local control units,
each of the local control units is provided for a set of each of the actuators, each of the driving amount monitors, and each of the optical axis monitors, controls each of the actuators based on a monitoring result of each of the optical axis monitors, and determines abnormality of a driving amount of each of the actuators based on the monitoring result of each of the driving amount monitors, and
the supervisory control unit identifies an optical element in which abnormality has occurred among the optical elements, based on a determination result of each of the local control unit.

6. The laser apparatus according to claim 5, wherein
when it is determined that driving amounts of two or more actuators are abnormal, the supervisory control unit identifies that abnormality has occurred in an optical element provided on a most upstream side, of the optical elements corresponding to the two or more actuators.

7. The laser apparatus according to claim 1, wherein
The optical axis monitor monitors a beam position and beam pointing of a laser beam.

8. The laser apparatus according to claim 1, wherein
the control unit further determines abnormality of the optical element based on a difference between a value representing a monitoring result of the optical axis monitor and a target value regarding the laser beam axis.

9. An EUV light generating system comprising:
an EUV chamber in which EUV light is generated; and
a laser apparatus configured to emit laser beam to be guided to the EUV chamber,
the laser apparatus including:
an optical element disposed on a laser beam axis;
an actuator configured to displace the optical element to displace the laser beam axis;
a driving amount monitor configured to monitor a driving amount of the actuator;
an optical axis monitor disposed along the laser beam axis and configured to monitor the laser beam axis; and
a control unit configured to control the actuator based on a monitoring result of the optical axis monitor, and determine abnormality of the optical element based on a monitoring result of the driving amount monitor.

* * * * *